(12) United States Patent
DeMay

(10) Patent No.: US 12,338,594 B2
(45) Date of Patent: Jun. 24, 2025

(54) FRAME RAIL ASSEMBLIES AND INTERLOCKING FRAME RAIL SYSTEMS

(71) Applicant: Steven Edward DeMay, Bullhead City, AZ (US)

(72) Inventor: Steven Edward DeMay, Bullhead City, AZ (US)

(*) Notice: Subject to any disclaimer, the term of this patent is extended or adjusted under 35 U.S.C. 154(b) by 0 days.

(21) Appl. No.: 18/392,185

(22) Filed: Dec. 21, 2023

(65) Prior Publication Data

US 2024/0125069 A1  Apr. 18, 2024

Related U.S. Application Data

(63) Continuation of application No. 17/702,697, filed on Mar. 23, 2022, now Pat. No. 11,879,223, which is a continuation of application No. 16/698,611, filed on Nov. 27, 2019, now Pat. No. 11,313,093.

(60) Provisional application No. 62/773,957, filed on Nov. 30, 2018.

(51) Int. Cl.
*E02B 3/26* (2006.01)
*B63B 59/02* (2006.01)
*E02B 3/06* (2006.01)

(52) U.S. Cl.
CPC ............... *E02B 3/26* (2013.01); *B63B 59/02* (2013.01); *E02B 3/068* (2013.01)

(58) Field of Classification Search
CPC ............ E02B 3/26; E02B 3/068; B63B 59/02
See application file for complete search history.

(56) References Cited

U.S. PATENT DOCUMENTS

| | | |
|---|---|---|
| 3,106,182 A | 10/1963 | Mayer |
| 3,152,568 A | 10/1964 | Mayer |
| 3,740,455 A | 6/1973 | Willox |
| 3,745,607 A * | 7/1973 | Cleff ................. E05D 5/023 16/252 |
| 3,897,967 A | 8/1975 | Barenyi |
| 4,078,515 A | 3/1978 | Svirklys |
| 4,126,006 A | 11/1978 | Lewis |
| 4,351,868 A | 9/1982 | Otani |
| 4,360,549 A | 11/1982 | Ozawa et al. |
| 4,548,150 A | 10/1985 | Drewett |
| 4,645,380 A | 2/1987 | Hambrick et al. |
| 4,696,136 A | 9/1987 | Grewe |
| 4,946,727 A * | 8/1990 | Kessler .............. B32B 7/022 24/297 |
| 4,968,182 A | 11/1990 | Westwell |
| 5,013,596 A | 5/1991 | Kessler |
| 5,027,736 A | 7/1991 | Drews |
| 607,298 A | 7/1998 | Theleen |
| 5,836,134 A | 11/1998 | Couto et al. |
| 5,845,594 A | 12/1998 | Hallsten et al. |
| 6,217,259 B1 | 4/2001 | Godbersen |

(Continued)

*Primary Examiner* — Stephen P Avila
(74) *Attorney, Agent, or Firm* — The Powers IP Law Firm

(57) ABSTRACT

A boat dock structure includes an upper deck, sides extending downward from the upper deck, and a wheel bumper having a substantially round shape. The wheel bumper has a first portion and a second portion, the first portion being positioned under the upper deck, the second portion extending outward from the cutout portion of at least one of the sides to protect the boat dock and a boat from damage when the boat is docking at the boat dock adjacent to the wheel bumper. At least one of the sides may have a cutout portion.

20 Claims, 35 Drawing Sheets

(56) References Cited

U.S. PATENT DOCUMENTS

| | | |
|---|---|---|
| 6,477,973 B1 | 11/2002 | Kobas |
| 6,536,992 B1 | 3/2003 | Floe |
| 7,163,244 B2 | 1/2007 | Meltzer |
| 7,624,694 B2 | 12/2009 | Aschenbach |
| 8,480,333 B2 | 7/2013 | DeMay |
| 8,647,018 B2 | 2/2014 | DeMay |
| 8,920,076 B2 | 12/2014 | DeMay |
| 9,038,556 B2 | 5/2015 | Ulgen |
| 9,073,613 B2 * | 7/2015 | Berman ................ B63B 59/02 |
| 9,926,681 B2 | 3/2018 | DeMay |
| 10,184,220 B1 | 1/2019 | McGilvery |
| 11,313,093 B2 | 4/2022 | DeMay |
| 2001/0047636 A1 | 12/2001 | Shows |
| 2004/0016185 A1 | 1/2004 | Wulfert et al. |
| 2004/0016383 A1 | 1/2004 | Aschenbach |
| 2004/0126185 A1 | 7/2004 | Davidson et al. |
| 2012/0003050 A1 * | 1/2012 | DeMay .................... E02B 3/26 |
| | | 405/215 |
| 2014/0182505 A1 | 7/2014 | Dustin |

* cited by examiner

FRAME RAIL ASSEMBLIES AND INTERLOCKING FRAME RAIL SYSTEMS

RELATED APPLICATIONS

This application is a continuation of U.S. application Ser. No. 17/702,697, filed Mar. 23, 2022, which is a continuation of U.S. application Ser. No. 16/698,611, filed Nov. 27, 2019, now U.S. Pat. No. 11,313,093, which claims priority to U.S. provisional application No. 62/773,957, filed Nov. 30, 2018. The entire contents of each earlier application is incorporated herein by reference.

FIELD OF THE INVENTION

The present invention relates generally to frame rail assemblies for boat dock structures, and to an interlocking frame rail system for effectively and easily interlocking corresponding frame rails.

BACKGROUND OF THE INVENTION

Many boat dock structures are designed such that they may accommodate rub-rails. Rub-rails are often fastened to the sides of boat dock structures using mechanical fasteners, such as screws, nails, or bolts. This creates potential tear or fracture points along the nib-rails. Impact from watercraft vehicles may easily dislodge rub-rails that are mechanically fastened to the sides of boat docks. Thus, there is an ongoing need for nib-rails that may be securely coupled to the sides of boat dock structures.

Frame rails for boat docks exist in a variety of designs. A frame rail system may be designed to accommodate an existing boat dock structure; or conversely, a boat dock structure may be designed to accommodate an existing frame rail system. However, existing designs for frame rails fail to provide an effective and relatively simple means for interlocking corresponding frame rails so as to provide for the coupling of separate boat dock structures. In addition, the existing designs for frame rail systems fail to provide a means for effectively accommodating rub-rails, as described above.

Thus, there is an ongoing need for frame rail systems that provide an effective means for interlocking corresponding frame rails. There is also an ongoing need for frame rails that provide for the effective accommodation of rub-rails.

SUMMARY OF THE INVENTION

To address the foregoing problems, in whole or in part, and/or other problems that may have been observed by persons skilled in the art, the present disclosure provides methods, apparatus, instruments, and/or devices, as described by way of example in implementations set forth below.

According to one implementation, a boat dock structure includes an upper deck, sides extending downward from the upper deck, at least one of the sides having a cutout portion, and a wheel bumper having a substantially round shape. The wheel bumper has a first portion and a second portion, the first portion being positioned under the upper deck, the second portion extending outward from the cutout portion of at least one of the sides to protect the boat dock and a boat from damage when the boat is docking at the boat dock adjacent to the wheel bumper.

According to another implementation, a boat dock structure includes an upper deck, sides extending downward from the upper deck, a wheel bumper extending outward from at least one of the sides to protect the boat dock and a boat from damage when the boat is docking at the boat dock adjacent to the wheel bumper, and attaching structure configured to attach the wheel bumper to the boat dock, at least a portion of the attaching structure disposed under the upper deck such that the at least one of the sides is between the portion of the attaching structure and the boat.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION OF THE INVENTION

Figure 1:
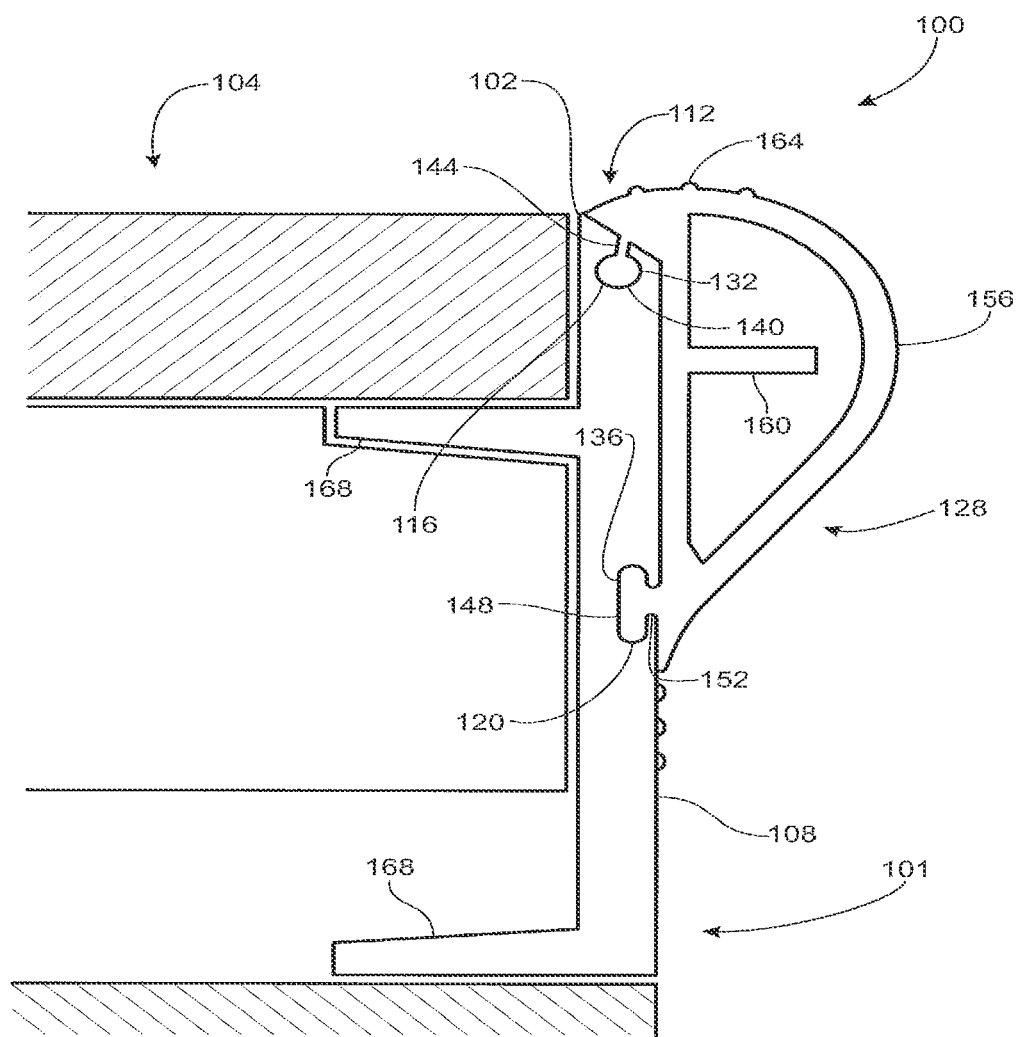
FIG. 1 is a cut-away view of a portion of an implementation of a frame rail assembly according to the present invention, showing a frame rail member secured to a side of a boat dock structure.

FIG. 1 is a cut-away view of a portion of an implementation of a frame rail assembly 100 according to the present invention, showing a frame rail member 101 secured to a side of a boat dock structure 104. The frame rail assembly 100 may generally include the frame rail member 101 and a removable resilient rub-rail member 128. The frame rail member 101 generally includes a first side 102 configured for securing the frame rail member 101 to the side of the boat dock structure 104, a second side 108 opposing the first side 102, a first channel 116 extending along a length of the frame rail member 101, and a second channel 120 extending along the length of the frame rail member 101.

As illustrated in FIG. 1, the rub-rail member 128 may project outward from the second side 108. The rub-rail member 128 generally extends along at least a portion of the length of the frame rail member 101. The rub-rail member 128 may include a first coupling member 132 extending through the first channel 116 in engagement therewith, and a second coupling member 136 extending through the second channel 120 in engagement therewith. The first coupling member 132 and the second coupling member 136 generally extend continuously along a length of the nib-rail member 128. As also illustrated in FIG. 1, the first channel 116 may include an inner section 140 and an outer section 144 that opens at an outer surface of the frame rail member 101, where the inner section 140 has a larger cross-sectional area than the outer section 144. As further illustrated in FIG. 1, in some implementations a top surface 112 of the frame rail member 101 may be sloped and the outer section 144 of the first channel 116 may open at the top surface 112. The second channel 120 may include an inner section 148 and an outer section 152 that opens at an outer surface of the frame rail member 101, where the inner section 148 has a larger cross-sectional area than the outer section 152. The shapes of the first coupling member 132 and the second coupling member 136 may be complementary to the respective shapes of the first channel 116 and the second channel 120, such that the rub-rail member 128 may be limited to longitudinal insertion and removal by, e.g., slidably inserting the nib-rail member 128 into the frame rail member 101 or slidably removing the rub-rail member 128 from the frame rail member 101. For instance, the coupling members 132, 136 may not be removed by pulling them out from the frame rail member 101 in a direction perpendicular to the length of the frame rail member 101. The rub-rail member 128 may include an outer bumper shell 156 projecting outward from the second side 108 of the frame rail member 101, and an inner rib 160 disposed inside the outer bumper shell 156. The inner rib 160 may be configured for supporting the outer bumper shell 156 upon heavy impact, and may be oriented so as to be less deformable than the outer bumper shell 156. For example, the inner rib 160 may project outward from the frame rail member 101 such that the inner rib 160 comes into contact with the outer bumper shell 156 upon heavy impact, thus creating a support mechanism for keeping the outer bumper shell 156 from coming into contact with the frame rail member 101 upon heavy impact from watercraft vehicles. The rub-rail member 128 may include at least one raised ridge 164 for improved traction. The removable rub-rail member 128 may be constructed from, for example, high-density polyurethane, polyethylene, or various other types of polymers.

The frame rail member 101 may be made of, for example, extruded aluminum with engineered first and second channels 116, 120. As illustrated in FIG. 1, the frame rail member 101 may include one or more toe members 168 for securing the first side 102 of the frame rail member 101 to the side of the boat dock structure 104. The frame rail member 101 may be configured such that a user may subsequently construct the boat dock structure 104 to accommodate the frame rail member 101; or the user may secure a frame rail to an existing side of a boat dock structure (as discussed below with respect to FIG. 5). Those of skill in the art will appreciate that the frame rail member 101 may be secured to the side of the boat dock structure 104 by any suitable means.

It will be understood that the term "boat dock structure" is not meant to limit the scope of the invention to use in conjunction with boat dock structures such as boat docks, fingers and headwalks. The term "boat dock structure" as used herein may encompass any and all types of structures that may utilize the present invention, such as, for example, automobile trailers, buildings and the like.

Figure 2:
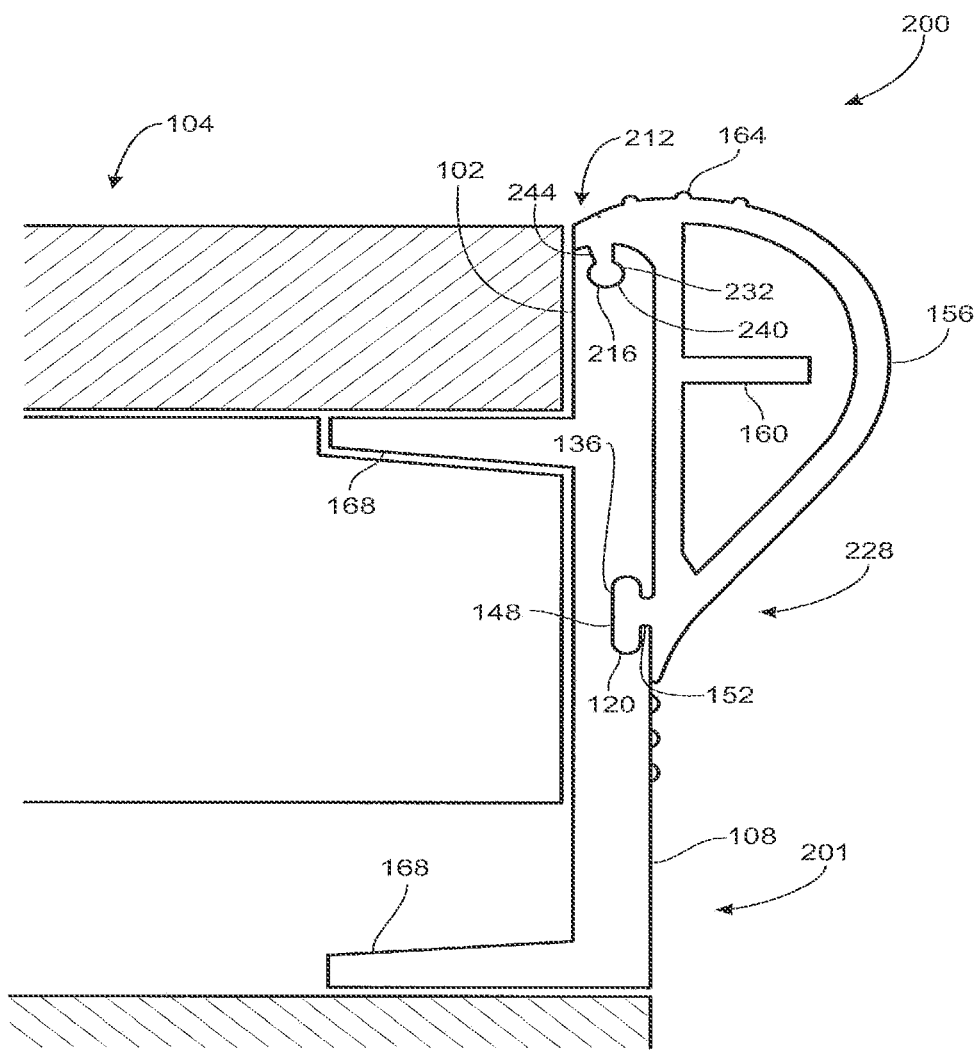
FIG. 2 is a cut-away view of a portion of another implementation of a frame rail assembly according to the present invention, showing a frame rail member secured to a side of a boat dock structure.

FIG. 2 is a cut-away view of a portion of another implementation of a frame rail assembly 200 according to the present invention, showing a frame rail member 201 secured to a side of the boat dock structure 104. FIG. 2 illustrates a rounded top surface 212 of the frame rail member 201 and an alternative location for a first channel 216 of the frame rail member 201, and accordingly illustrates an outer section 244 and an inner section 240 of the first channel 216. In the present example, the outer section 240 of the first channel 216 opens at the rounded top surface 212 of the frame rail member 201. In the present implementation illustrated in FIG. 2, a first coupling member 232 of a removable rub-rail member 228 is complementary in shape to the first channel 216 of the frame rail member 201, thus limiting the rub-rail member 228 to longitudinal insertion into and removal from the frame rail member 201. The frame rail assembly 200 may be utilized as described above with respect to FIG. 1, or as otherwise described herein.

Figure 3:
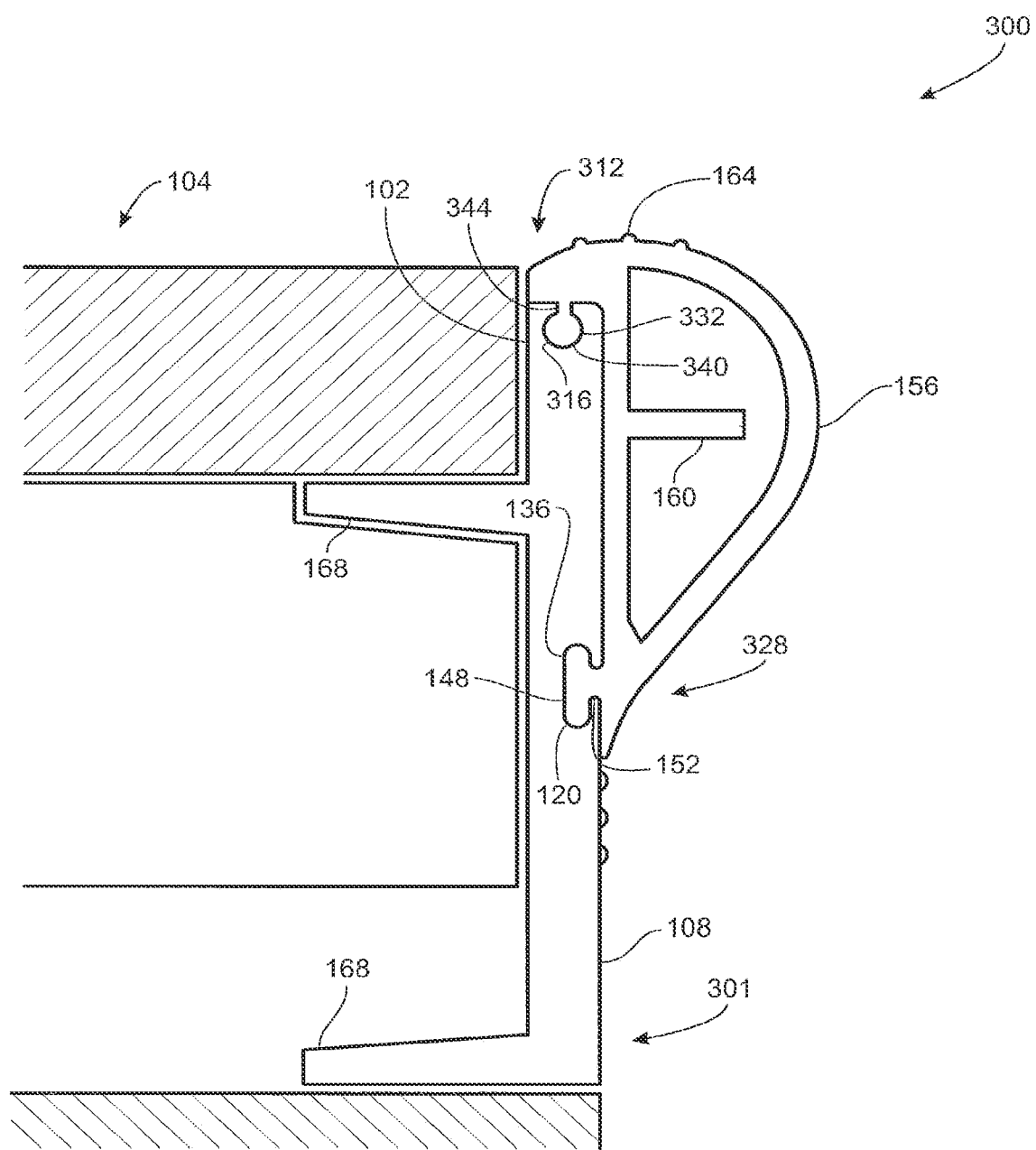
FIG. 3 is a cut-away view of a portion of another implementation of a frame rail assembly according to the present invention, showing a frame rail member secured to a side of a boat dock structure.

FIG. 3 is a cut-away view of a portion of another implementation of a frame rail assembly 300 according to the present invention, showing a frame rail member 301 secured to a side of the boat dock structure 104. FIG. 3 illustrates a substantially flat top surface 312 of the frame rail member 301 and an alternative location for a first channel 316 of the frame rail member 301, and accordingly illustrates an outer section 344 and an inner section 340 of the first channel 316. In the present example, the outer section 340 of the first channel 316 opens at the substantially flat top surface 312 of the frame rail member 301. The first channel 316 extends from the top surface 312 of the frame rail member 301 in a direction perpendicular to the length of the frame rail member 301. A first coupling member 332 of a removable rub-rail member 328 is complementary in shape to the first channel 316 of the frame rail member 301, thus limiting the nib-rail member 328 to longitudinal insertion into and removal from the frame rail member 301. The frame rail assembly 300 may be utilized as described above with respect to FIG. 1 and FIG. 2, or as otherwise described herein.

Figure 4:
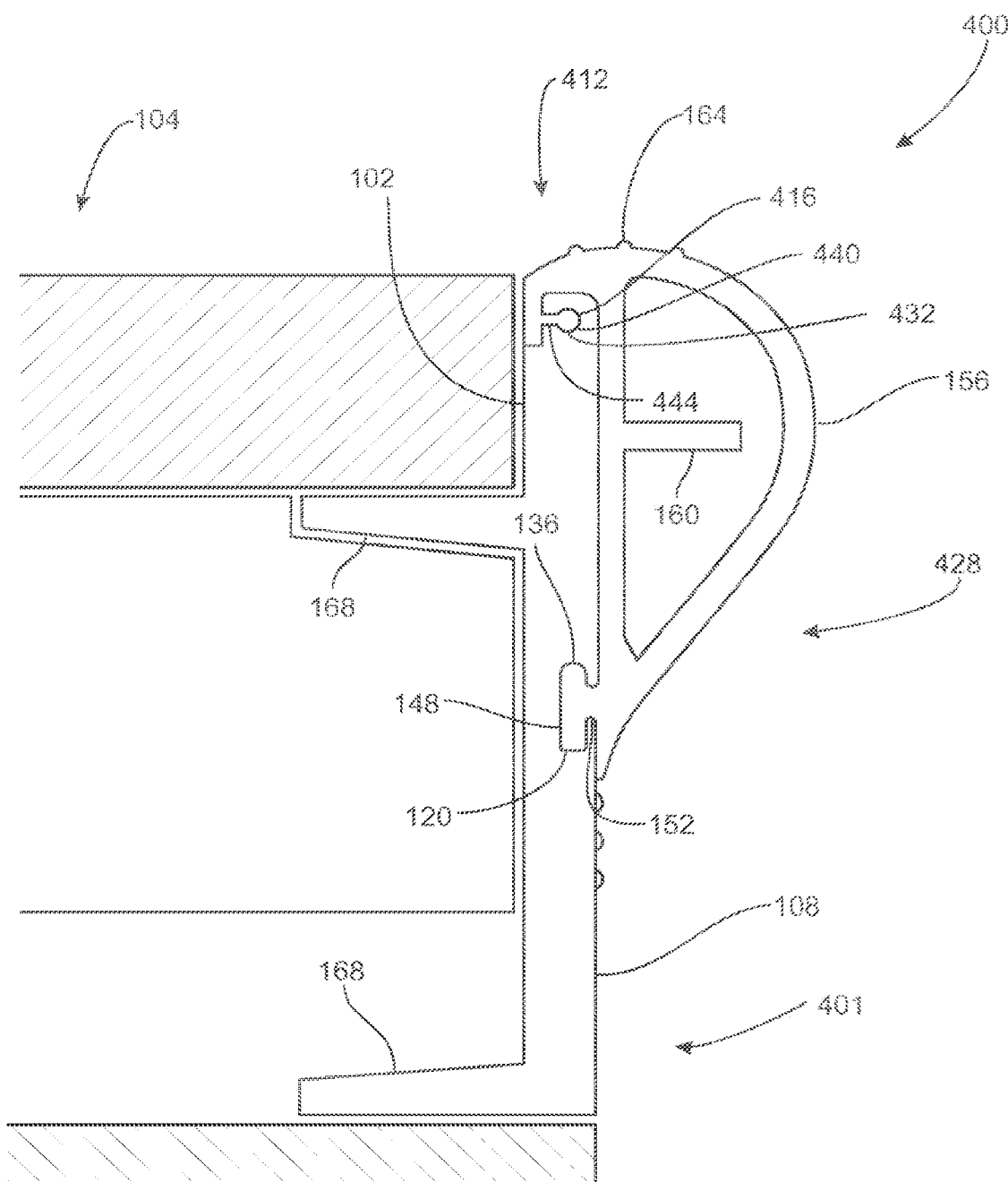
FIG. 4 is a cut-away view of a portion of another implementation of a frame rail assembly according to the present invention, showing a frame rail member secured to a side of a boat dock structure.

FIG. 4 is a cut-away view of a portion of another implementation of a frame rail assembly 400 according to the present invention, showing a frame rail member 401 secured to a side of the boat dock structure 104. FIG. 4 illustrates a section 412 of a removable rub-rail member 428 adjacent to the first side 102 of the frame rail member 401 and interposed between the first side 102 of the frame rail member 401 and the side of the boat dock structure 104. FIG. 4 illustrates an alternative location for a first channel 416 of the frame rail member 401, and accordingly illustrates an outer section 444 and an inner section 440 of the first channel 416. The outer section 444 of the first channel 416 opens to the first side 102 of the frame rail member 401. A first coupling member 432 of the removable rub-rail member 428 is complementary in shape to the first channel 416 of the frame rail member 401, thus limiting the rub-rail member 428 to longitudinal insertion into and removal from the frame rail member 401. The frame rail assembly 400 may be utilized as described above with respect to FIGS. 1 through 3, or as otherwise described herein.

Figure 5:
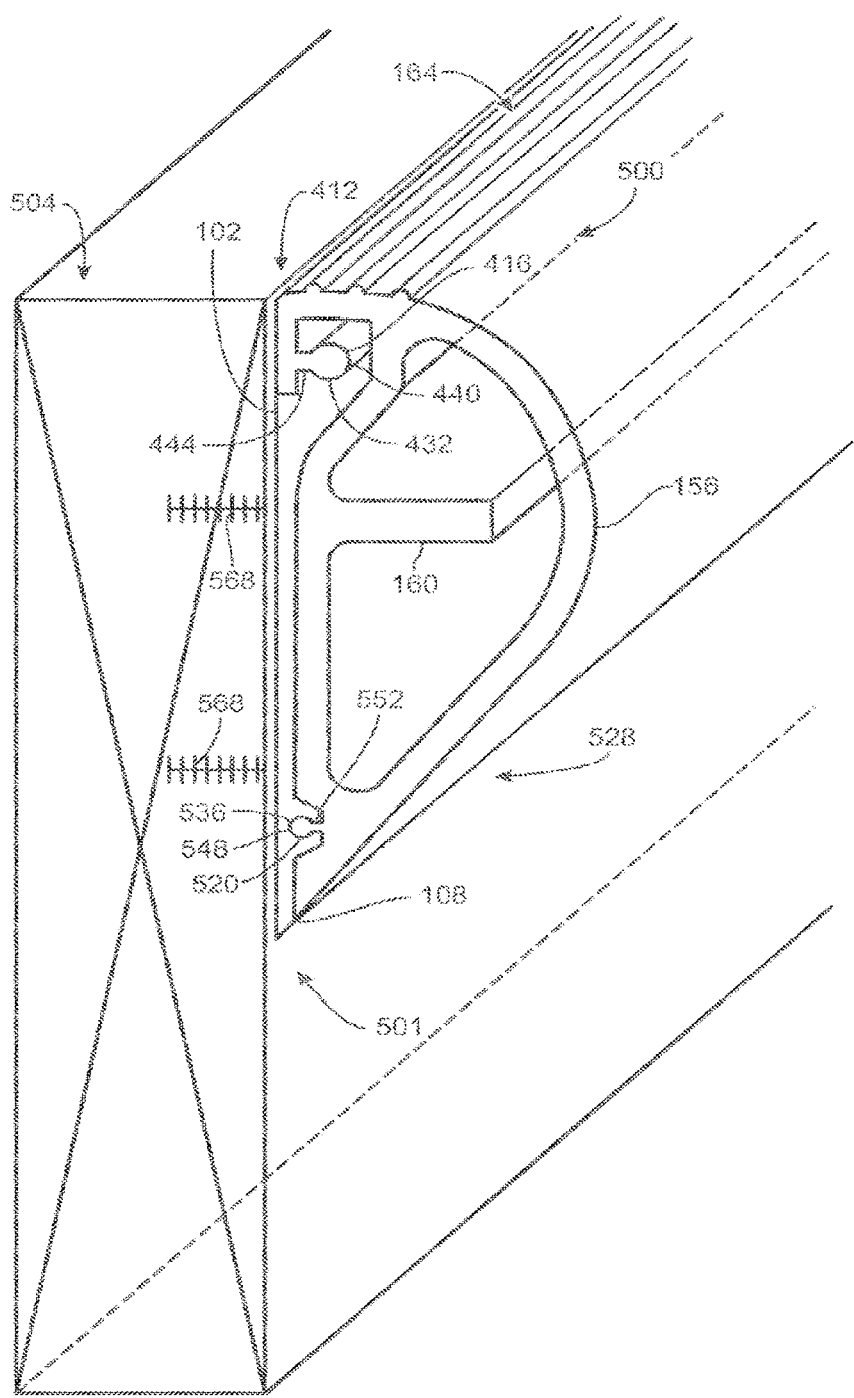
FIG. 5 is a cut-away view of a portion of another implementation of a frame rail assembly according to the present invention, showing a frame rail member secured to a side of a boat dock structure.

FIG. 5 is a cut-away view of a portion of another implementation of a frame rail assembly 500 according to the present invention, showing a frame rail member 501 secured to a side of a boat dock structure 504. FIG. 5 illustrates an alternative shape for a second channel 520 of the frame rail member 501, and accordingly illustrates an outer section 552 and an inner section 548 of the second channel 520. A second coupling member 536 of a removable rub-rail member 528 may be complementary in shape to the second channel 520 of the frame rail member 501, thus limiting the nib-rail member 528 to longitudinal insertion into and removal from the frame rail member 501. As also illustrated in FIG. 5, a user may secure the frame rail member 501 (or any of the other frame rail members 101, 201, 301, 401) to the side of an existing boat dock structure 504 through the use of mechanical fasteners, such as counter-set screws 568, nails, or the like, or, for example, through welding. Alternatively, the frame rail member 501 may be configured such that a user may subsequently construct a boat dock structure to accommodate the frame rail member 501, as previously noted. All such methods entailing the use of the frame rail member 501 are encompassed by the present invention.

Figure 6:
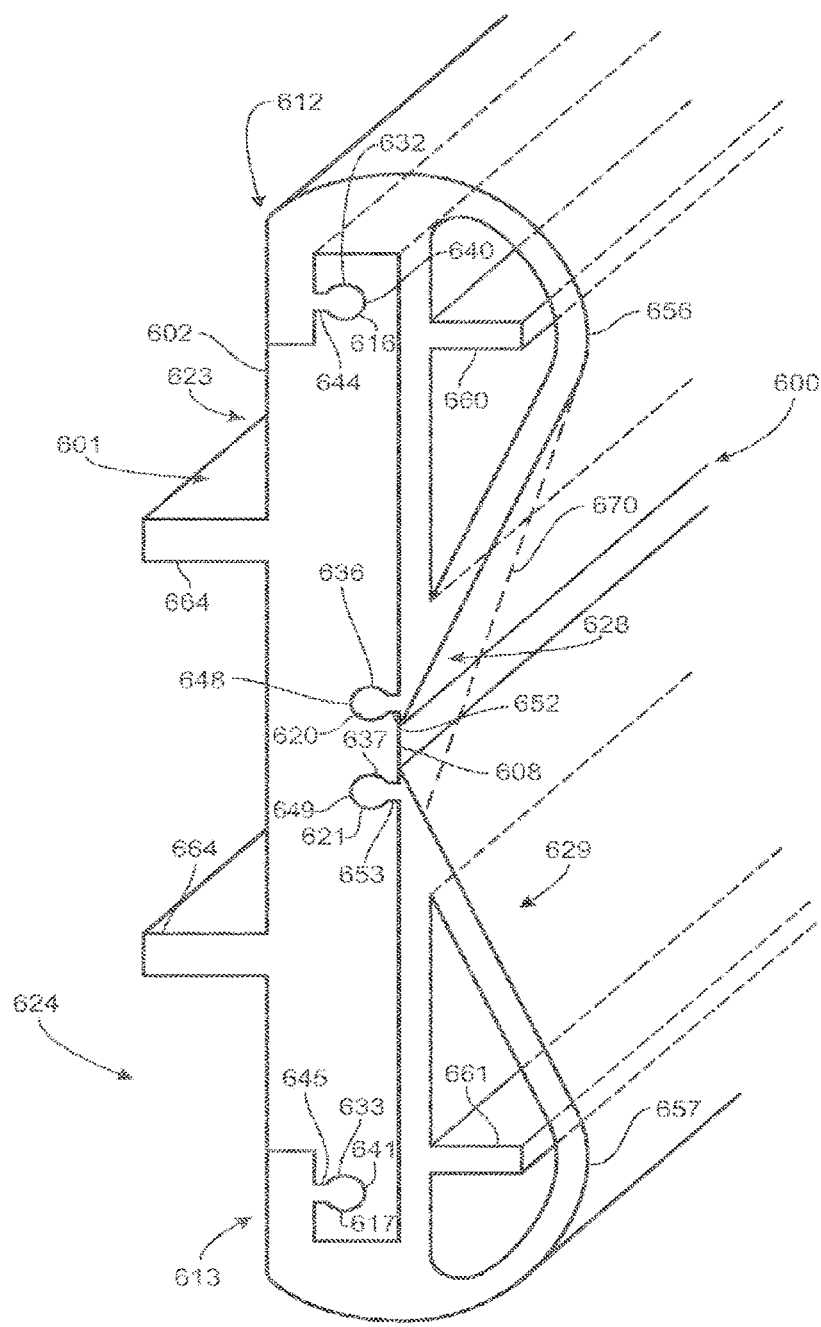
FIG. 6 is a cut-away view of a portion of another implementation of a frame rail assembly according to the present invention, showing first and second nib-rail members.

FIG. 6 is a cut-away view of a portion of another implementation of a frame rail assembly 600 according to the present invention, showing a first rub-rail member 628 and a second nib-rail member 629. As illustrated in FIG. 6, the frame rail assembly 600 may generally include a frame rail member 601, the first removable resilient rub-rail member 628, and the second removable resilient rub-rail member 629. The frame rail member 601 may include a first side 602 configured for securing the frame rail member 601 to a side of a boat dock structure, a second side 608 opposing the first side 602, an upper section 623 between the first side 602 and the second side 608, a first channel 616 extending along a length of the frame rail member 601, a second channel 620 extending along the length of the frame rail member 601, and a lower section 624 between the first side 602 and the second side 608. The first channel 616 may generally be located in the upper section 623 of the frame rail member 601. The second channel 620 may generally be located below the first channel 616. The first rub-rail member 628 generally projects outward from the second side 608 and extends along at least a portion of the length of the frame rail member 601. The first rub-rail member 628 may include a first coupling member 632 extending through the first channel 616 in engagement therewith, and a second coupling member 636 extending through the second channel 620 in engagement therewith. The first channel 616 may include an inner section 640 and an outer section 644, where the inner section 640 has a larger cross-sectional area than the outer section 644. The second channel 620 may include an inner section 648 and an outer section 652, where the inner section 648 has a larger cross-sectional area than the outer section 652. The shapes of the first coupling member 632 and the second coupling member 636 may be complementary to the respective shapes of the first channel 616 and the second channel 620, such that the first rub-rail member 628 may be limited to longitudinal insertion and removal. The first nib-rail member 628 may include an outer bumper shell 656 projecting outward from the second side 608 of the frame rail member 601, and an inner rib 660 disposed inside the outer bumper shell 656. The inner rib 660 may generally be configured for supporting the outer bumper shell 656 upon heavy impact, and may be oriented so as to be less deformable than the outer bumper shell 656.

As further illustrated in FIG. 6, the frame rail member 601 may generally include a third channel 617 in the lower section 624 of the frame rail member 601 extending along the length of the frame rail member 601, a fourth channel 621 generally located above the third channel 617 and extending along the length of the frame rail member 601, and the second removable resilient rub-rail member 629 projecting outward from the second side 608 of the frame rail member 601 and extending along at least a portion of the length of the frame rail member 601. The second nib-rail member 629 may include a third coupling member 633 extending through the third channel 617 in engagement therewith, and a fourth coupling member 637 extending through the fourth channel 621 in engagement therewith. The third channel 617 may include an inner section 641 and an outer section 645, where the inner section 641 has a larger cross-sectional area that the outer section 645. The fourth channel 621 may include an inner section 649 and an outer section 653, where the inner section 649 has a larger cross-sectional area than the outer section 653. The shapes of the third coupling member 633 and the fourth coupling member 637 may be complementary to the respective shapes of the third channel 617 and the fourth channel 621, such that the second rub-rail member 629 may be limited to longitudinal insertion and removal. The second nib-rail member 629 may include an outer bumper shell 657 projecting outward from the second side 608 of the frame rail member 601, and an inner rib 661 disposed inside the outer bumper shell 657. The inner rib 661 may generally be configured for supporting the outer bumper shell 657 upon heavy impact, and may be oriented so as to be less deformable than the outer bumper shell 657.

As further illustrated in FIG. 6, the first nib rail member 628 may include a section 612 that is adjacent to the first side 602 of the frame rail member 601 and which may be interposed between the first side 602 of the frame rail member 601 and the side of the boat dock structure (not shown). The second nib-rail member 629 may include a section 613 that is adjacent to the first side 602 of the frame rail member 601 and which may be interposed between the first side 602 of the frame rail member 601 and the side of the boat dock structure (not shown).

Those skilled in the art will recognize that the frame rail member 601 may be configured to accommodate one rub-rail member, or a plurality of nib-rail members. For example, in one implementation, the second rub-rail member 629 may be removed from the frame rail assembly 600. The first nib-rail member 628 may be configured such that the outer bumper shell extends below the fourth channel 621, so as to cover, or partially cover the fourth channel 621, as illustrated by a phantom line 670. Those skilled in the art will also recognize that the frame rail members described herein may be utilized in conjunction with the interlocking frame rail system described below. As but one example, and as will become evident from the discussion below, the first rub-rail member 628 and the second rub-rail member 629 may be removed from the frame rail member 601, and the frame rail member 601 may be interlocked with a corresponding frame rail member.

Figure 7:
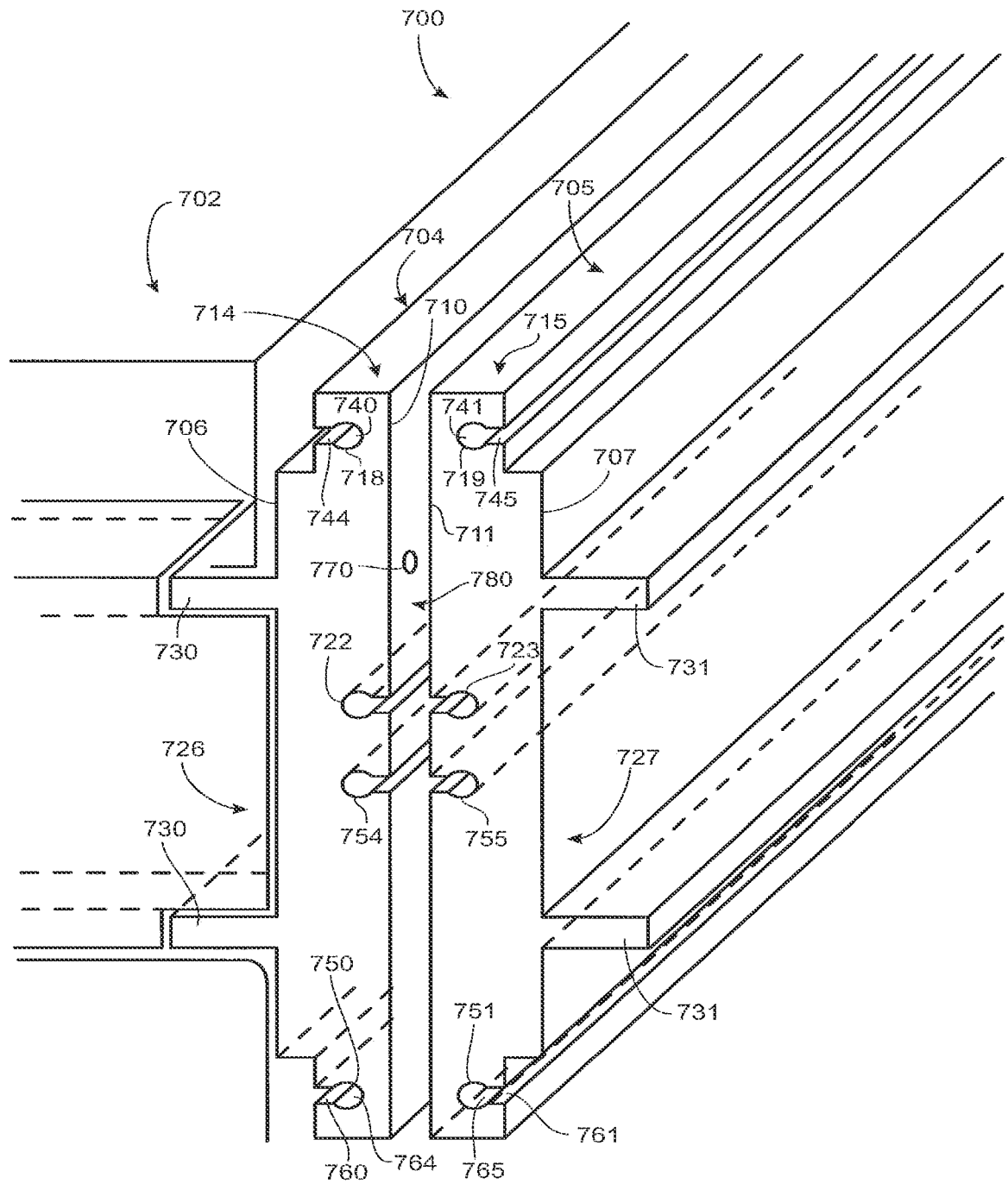
FIG. 7 is a perspective view of an interlocking frame rail system according to the present invention, showing a portion of a first frame rail member and a portion of a second frame rail member.

FIG. 7 is a perspective view of an interlocking frame rail system 700 according to the present invention, showing a portion of a first frame rail member 704 and a portion of a second frame rail member 705. In some implementations, the interlocking frame rail system 700 may include a first frame rail member 704, a second frame rail member 705, and a connector member (not shown). The first frame rail member 704 may generally include a first side 706 configured for securing the first frame rail member 704 to a side of a first boat dock structure 702, a second side 710 opposing the first side 706, an upper section 714 between the first side 706 and the second side 710, a first channel (or upper channel) 718 in the upper section 714 and extending along a length of the first frame rail member 704, a second channel (or first intermediate channel) 722 extending along the length of the first frame rail member 704, and a lower section 726 between the first side 706 and the second side 710. The second channel 722 may generally be located below the first channel 718. The first channel 718 may include an inner section 740 and an outer section 744, the inner section 740 having a larger cross-sectional area than the outer section 744.

In the present example, the second frame rail member 705 may generally include a first side 707 configured for securing the second frame rail member 705 to a side of a second boat dock structure (not shown), a second side 711 opposing the first side 707, an upper section 715 between the first side 707 and the second side 711, a first channel (or upper channel) 719 in the upper section 715 and extending along a length of the second frame rail member 705, a second channel (or first intermediate channel) 723 extending along the length of the second frame rail member 705, and a lower section 727 between the first side 707 and the second side 711. The second channel 723 may generally be located below the first channel 719. The first channel 719 may include an inner section 741 and an outer section 745, the inner section 741 having a larger cross-sectional area than the outer section 745.

As illustrated in FIG. 7, the first frame rail member 704 may include a third channel (or lower channel) 750 extending along the length of the first frame rail member 704 in the lower section 726 of the first frame rail member 704, and a fourth channel (or second intermediate channel) 754 above the third channel 750, the fourth channel 754 extending along the length of the first frame rail member 704. The third channel 750 may include an inner section 764 and an outer section 760, the inner section 764 having a larger cross-sectional area than the outer section 760.

As further illustrated in FIG. 7, the second frame rail member 705 may include a third channel (or lower channel) 751 extending along the length of the second frame rail member 705 in the lower section 727 of the second frame rail member 705, and a fourth channel (or second intermediate channel) 755 above the third channel 751, the fourth channel 755 extending along the length of the second frame rail member 705. The third channel 751 may include an inner section 765 and an outer section 761, the inner section 765 having a larger cross-sectional area than the outer section 761.

Figure 8:
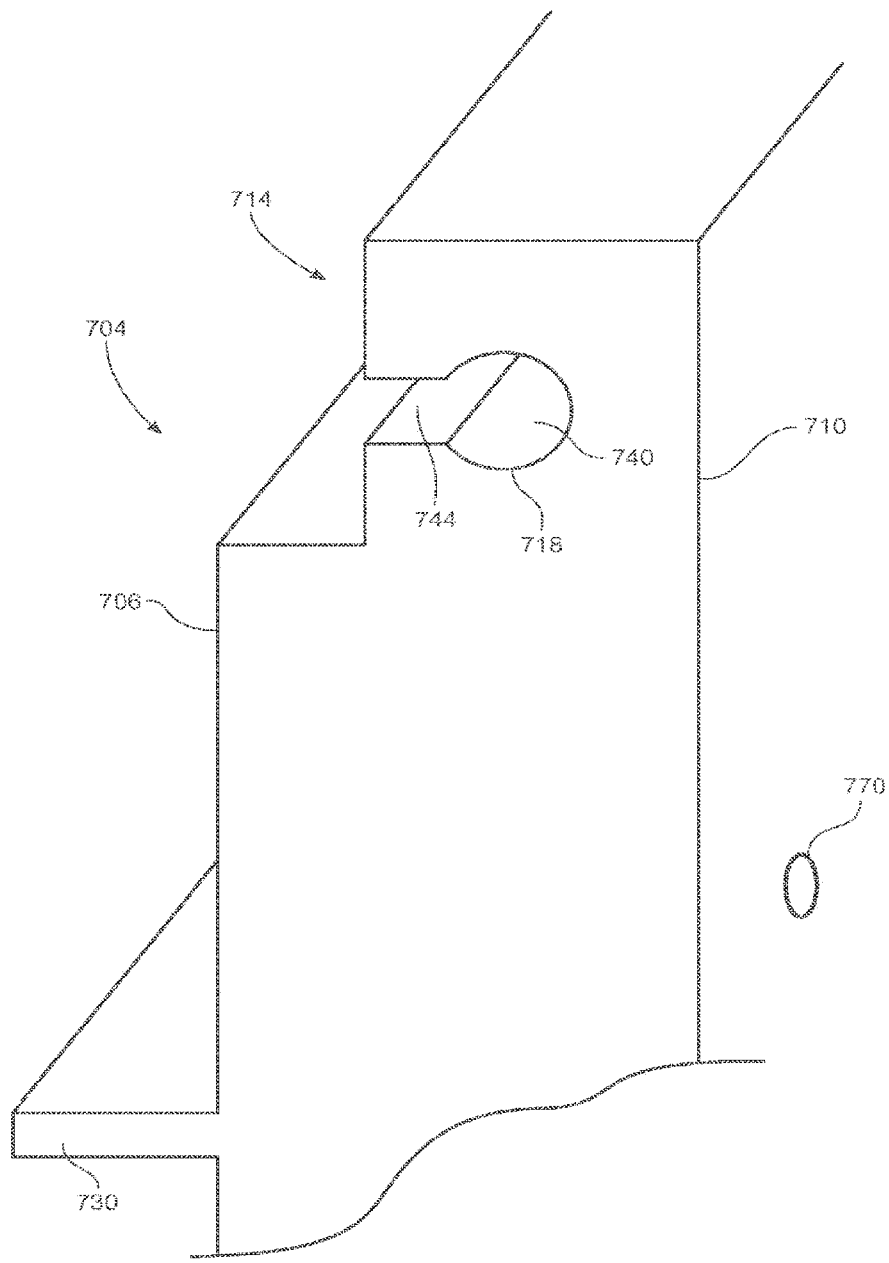
FIG. 8 is a perspective view of a portion of the first frame rail member illustrated in FIG. 7.

FIG. 8 is a perspective view of a portion of the first frame rail member 704 illustrated in FIG. 7. As illustrated in FIG. 7 and FIG. 8, in some implementations, the first frame rail member 704 may include at least one toe member 730 for securing the first side 706 of the first frame rail member 704 to the side of the first boat dock structure 702 (as shown in FIG. 7).

Figure 9:
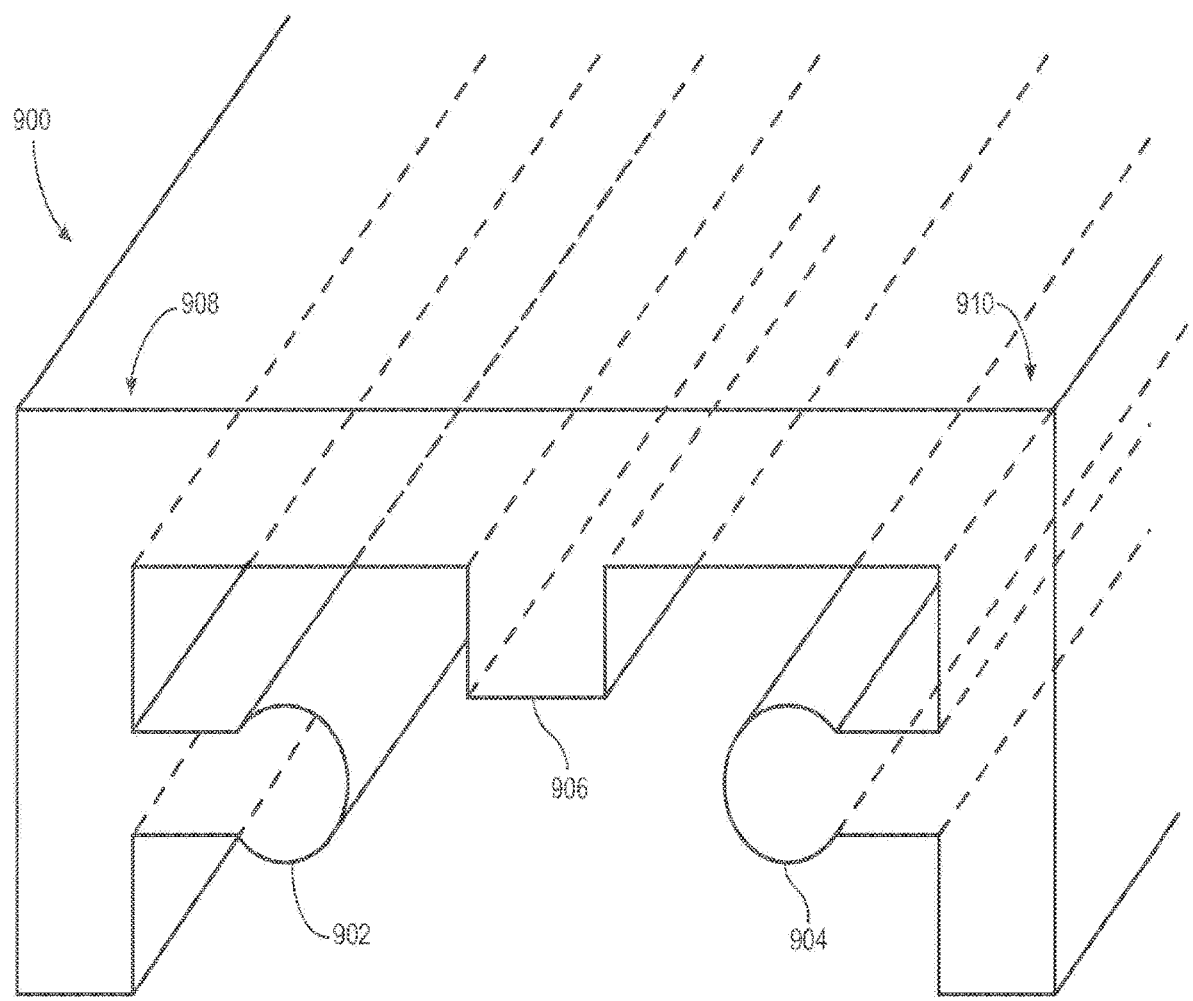
FIG. 9 is a perspective view of a portion of a connector member that may be utilized in an interlocking frame rail system according to the present invention.

FIG. 9 is a perspective view of a portion of the connector member 900 that may be utilized in the interlocking frame rail system 700 according to the present invention. The connector member 900 illustrated in FIG. 9 may be used to interlock the first frame rail member 704 and the second frame rail member 705 shown in FIG. 7. The connector member 900 may include a first coupling member 902 and a second coupling member 904. The first coupling member 902 and the second coupling member 904 may extend continuously along the length of the connector member 900. An interlocking frame rail system 700 according to the present invention may include an upper connector member and a lower connector member, one or both of which may be configured as the illustrated connector member 900. Alternatively, the interlocking frame rail system 700 may include only an upper connector member, or only a lower connector member. When the connector member 900 is utilized as an upper connector member, the connector member 900 may extend along at least a portion of the length of the first frame rail member 704 and at least a portion of the length of the second frame rail member 705. The first coupling member 902 may extend through the first channel 718 of the first frame rail member 704 in removable engagement therewith, and the second coupling member 904 may extend through the first channel 719 of the second frame rail member 705 in removable engagement therewith. The first coupling member 902 may be complementary in shape to the first channel 718 of the first frame rail member 704, and the second coupling member 904 may be complementary in shape to the first channel 719 of the second frame rail member 705, thus limiting the connector member to longitudinal insertion into and removal from the first and second frame rail members 704, 705.

Continuing with the present example, when the connector member 900 is utilized as a lower connector member, the connector member 900 may extend along at least a portion of the length of the first frame rail member 704 and at least a portion of the length of the second frame rail member 705. The first coupling member 902 may extend through the third channel 750 of the first frame rail member 704 in removable engagement therewith, and the second coupling member 904 may extend through the third channel 751 of the second frame rail member 705 in removable engagement therewith. The first coupling member 902 may be complementary in shape to the third channel 750 of the first frame rail member 704, and the second coupling member 904 may be complementary in shape to the third channel 751 of the second frame rail member 705, thus limiting the connector member 900 to longitudinal insertion into and removal from the first and second frame rail members 704, 705.

Those of skill in the art will appreciate that the connector member 900 may be constructed of various materials, such as extruded aluminum or various types of polymeric materials, including resilient materials. The connector member 900 may also include a projection 906 that may act as a spacer between the first frame rail member 704 and the second frame rail member 705.

Figure 10:
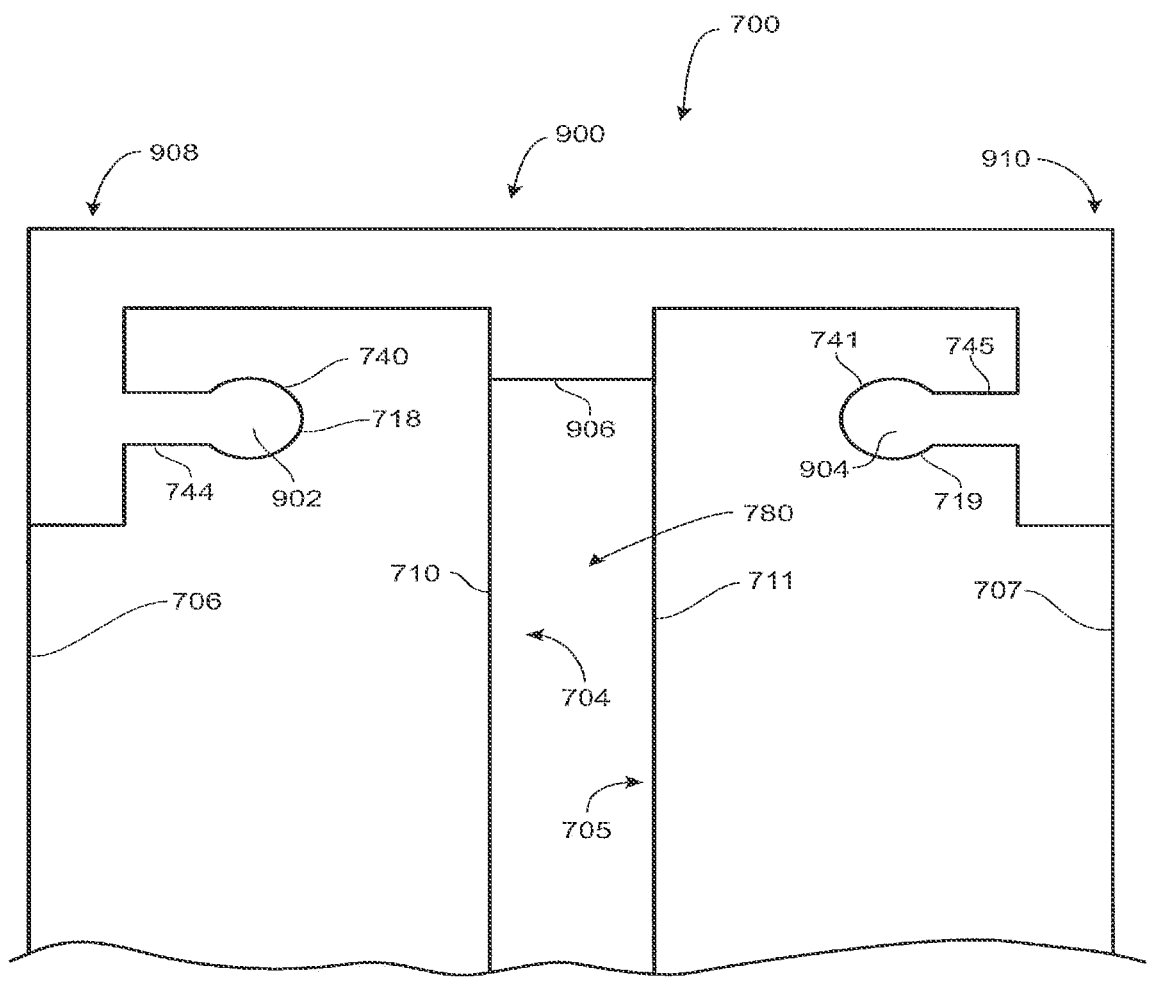
FIG. 10 is an elevation view of the interlocking frame rail system illustrated in FIG. 7 and the connector member illustrated in FIG. 9.

FIG. 10 is an elevation view of the interlocking frame rail system 700 illustrated in FIG. 7 and the connector member 900 illustrated in FIG. 9, showing the first coupling member 902 of the connector member 900 extending through the first channel 718 of the first frame rail member 704 in removable engagement therewith, and the second coupling member 904 of the connector member 900 extending through the first channel 719 of the second frame rail member 705 in removable engagement therewith. As illustrated in FIG. 10, the first coupling member 902 is shaped complementarily to the first channel 718 of the first frame rail member 704, and the second coupling member 904 is shaped complementarily to the first channel 719 of the second frame rail member 705, thus limiting the connector member 900 to longitudinal insertion into and removal from the first and second frame rail members 704, 705. The projection 906 of the connector member 900 acts as a spacer between the first frame rail member 704 and the second frame rail member 705, and extends into a gap 780 between the second side 710 of the first frame rail member 704 and the second side 711 of the second frame rail member 705. As also illustrated in FIG. 10, the connector member 900 may include a first section 908 that is adjacent to the first side 706 of the first frame rail member 704 and which may be interposed between the first side 706 of the first frame rail member 704 and the side of the first boat dock structure 702. The connector member 900 may include a second section 910 that is adjacent to the first side 707 of the second frame rail member 705 and which may be interposed between the first side 707 of the second frame rail member 705 and the side of the second boat dock structure (not shown).

Figure 11:
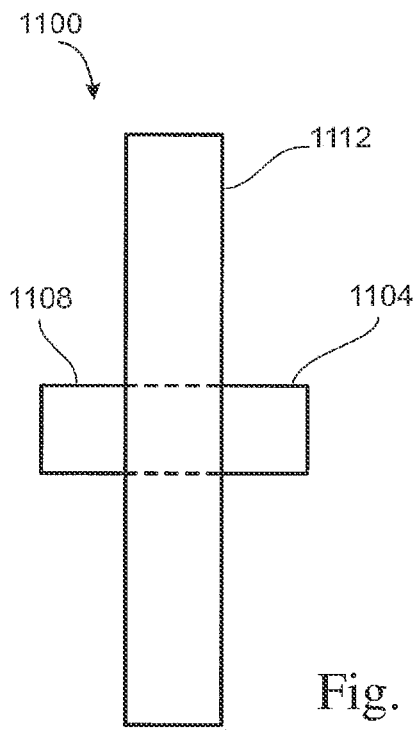
FIG. 11 is a side elevation view of an alignment pin that may be utilized in an interlocking frame rail system according to the present invention.

FIG. 11 is a side elevation view of an alignment pin 1100 that may be utilized in the interlocking frame rail system 700 according to the present invention. Viewed in connection with FIG. 7, the alignment pin 1100 may be disposed between the second side 710 of the first frame rail member 704 and the second side 711 of the second frame rail member 705. The alignment pin 1100 may generally include a first end 1108, a second end 1104, and a spacer member 1112 between the first end 1108 and the second end 1104. The first end 1108 may be configured for extending axially into a first aperture 770 located in the second side 710 of the first frame rail member 704. The second end 1104 may be configured for extending axially into a second aperture (not shown) located in the second side 711 of the second frame rail member 705, opposite to the corresponding first aperture 770. The alignment pin 1100 may be used to align the first frame rail member 704 and the second frame rail member 705, allowing the first frame rail member 704 and the second frame rail member 705 to be easily interlocked through the application of the connector member 900. The alignment pin 1100 may also aid in carrying any shear load applied vertically or horizontally to an interlocked first frame rail member 704 and second frame rail member 705. The spacer member 1112 of the alignment pin 1100 may be configured to provide the desired spacing between the first frame rail member 704 and the second frame rail member 705. The interlocking frame rail system 700 according to the present invention may include a plurality of such alignment pins 1100 disposed between the first frame rail member 704 and the second frame rail member 705. For this purpose, a plurality of corresponding first apertures 770 and second apertures may be provided in the respective first frame rail member 704 and second frame rail member 705.

Figure 12:
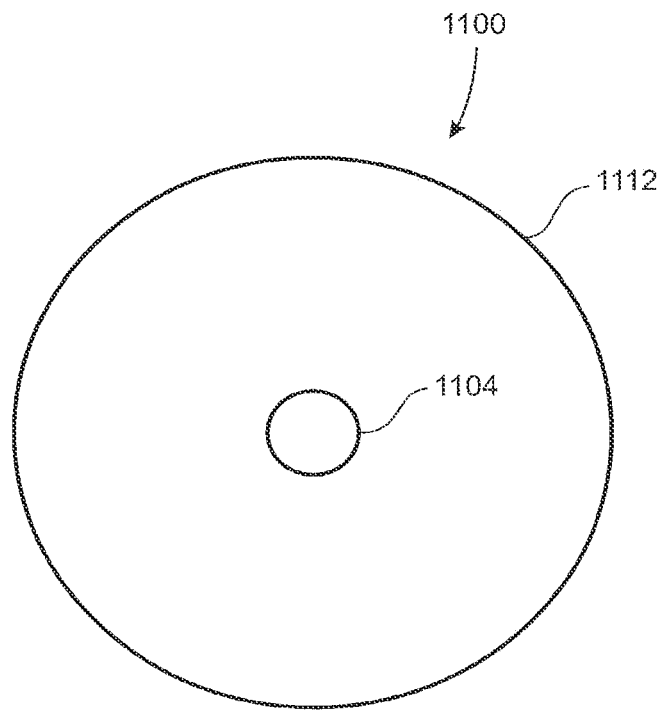
FIG. 12 is front elevation view of the alignment pin illustrated in FIG. 11.

FIG. 12 is a front elevation view of the alignment pin 1100 illustrated in FIG. 11. As shown in FIG. 12, the spacer member 1112 of the alignment pin 1100 may be circular in shape. The spacer member 1112 may generally be constructed of various materials, such as high-density polymers. Those skilled in the art will appreciate that the spacer member 1112 may be circular, rectangular, elliptical, or various other shapes.

Those of skill in the art will appreciate that the interlocking frame rail system 700 according to the present invention may be utilized to interlock various types of boat dock structures; e.g., walkways, boat docks, fingers, and the like. It will be understood that frame rail members as described above with respect to FIGS. 1 through 6 may be utilized in connection with the interlocking frame rail system 700 described herein. In one example, frame rail assemblies with removable rub-rails may be secured to two adjoining sides of a boat dock structure. A corner bumper member may be secured to one or more of the corresponding channels in the frame rail members of the adjoining sides of the boat dock structure. As another example, a user may secure frame rail members described herein to the sides of boat dock structures, and the user may utilize the frame rail members in connection with the interlocking frame rail system 700, or alternatively or additionally, removable rub-rail members may be secured to some or all of the frame rail members. All such methods entailing the use of the frame rail assemblies and/or interlocking frame rail systems 700 are encompassed by the present invention.

Figure 13:
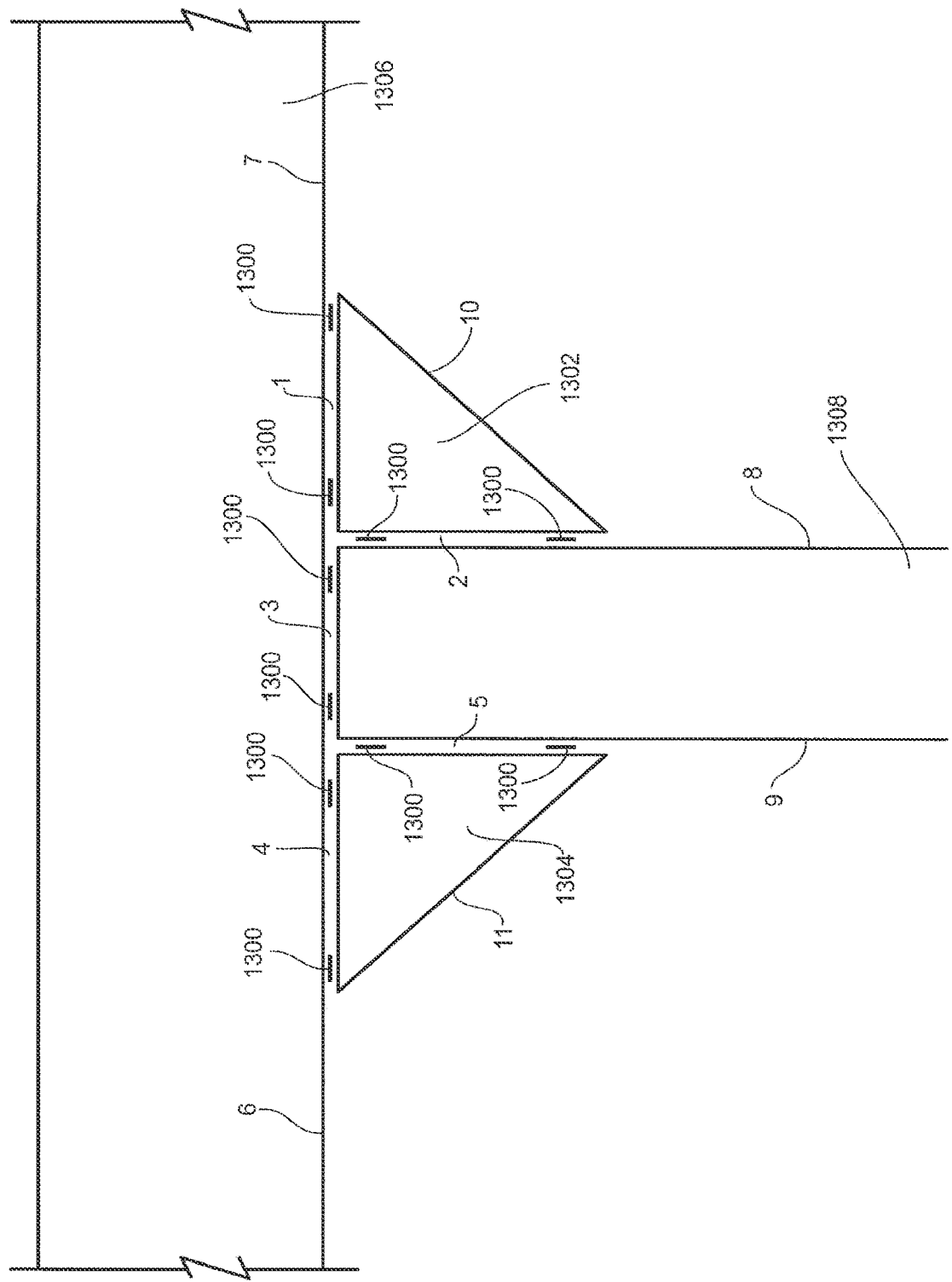
FIG. 13 is a top plan view of various boat dock structures, schematically depicting locations that may be fitted with frame rail assemblies and interlocking frame rail systems according to the present invention.

FIG. 13 is a top plan view of various boat dock structures, schematically depicting locations that may be fitted with frame rail assemblies and interlocking frame rail systems 700 according to the present invention. FIG. 13 schematically depicts a walkway 1306, a first brace structure 1302, a second brace structure 1304, and a finger 1308. Frame rail assemblies including removable rub-rail members according to the present invention may be secured to locations 6 through 11, for example. Interlocking frame rail systems 700 according to the present invention may be secured to locations 1 though 5, for example. An alignment pin 1300, or a plurality of alignment pins 1300, as described herein may be provided in the various interlocking frame rail systems 700.

Figure 14:
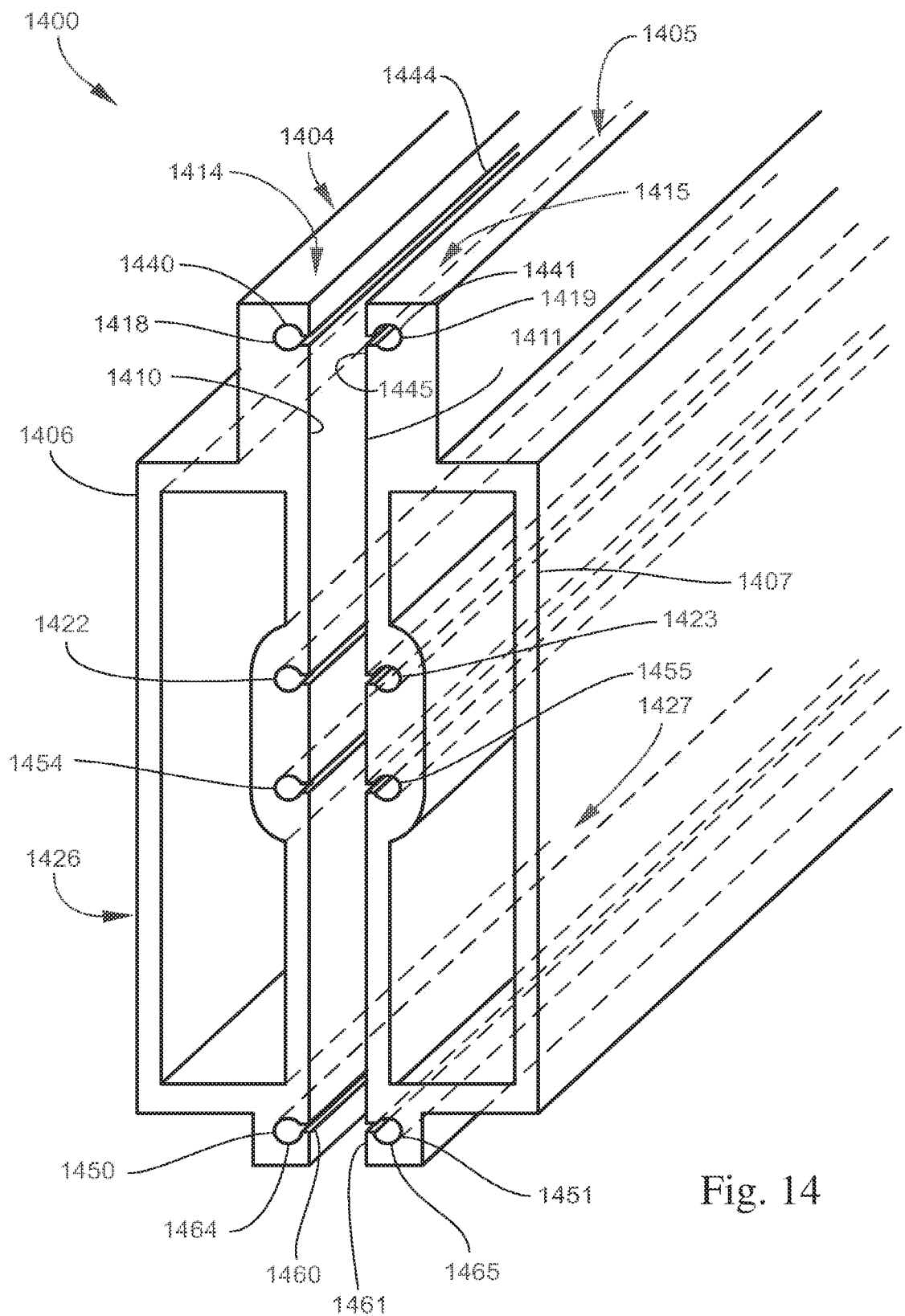
FIG. 14 is a perspective view of an example of an interlocking frame rail system according to another embodiment.

FIG. 14 is a perspective view of an example of an interlocking frame rail system 1400 according to another embodiment, showing a portion of a first frame rail member 1404 and a portion of a second frame rail member 1405. In some implementations, the interlocking frame rail system 1400 may include a first frame rail member 1404, a second frame rail member 1405, and one or more connector members, a non-limiting example of which is described below in conjunction with FIG. 15. The first frame rail member 1404 may generally include a first side 1406 configured for securing the first frame rail member 1404 to a side of a first boat dock structure (not shown, but see FIG. 7 and related description above), a second side 1410 opposing the first side 1406, an upper section 1414 between the first side 1406 and the second side 1410, a first channel (or upper channel) 1418 in the upper section 1414 and extending along a length of the first frame rail member 1404, a second channel (or first intermediate channel) 1422 extending along the length of the first frame rail member 1404, and a lower section 1426 between the first side 1406 and the second side 1410. The second channel 1422 may generally be located below the first channel 1418. The first channel 1418 may include an inner section 1440 and an outer section 1444, the inner section 1440 having a larger cross-sectional area than the outer section 1444.

In the present example, the second frame rail member 1405 may generally include a first side 1407 configured for securing the second frame rail member 1405 to a side of a second boat dock structure (not shown), a second side 1411 opposing the first side 1407, an upper section 1415 between the first side 1407 and the second side 1411, a first channel (or upper channel) 1419 in the upper section 1415 and extending along a length of the second frame rail member 1405, a second channel (or first intermediate channel) 1423 extending along the length of the second frame rail member 1405, and a lower section 1427 between the first side 1407 and the second side 1411. The second channel 1423 may generally be located below the first channel 1419. The first channel 1419 may include an inner section 1441 and an outer section 1445, the inner section 1441 having a larger cross-sectional area than the outer section 1445.

As illustrated in FIG. 14, the first frame rail member 1404 may include a third channel (or lower channel) 1450 extending along the length of the first frame rail member 1404 in the lower section 1426 of the first frame rail member 1404, and a fourth channel (or second intermediate channel) 1454 above the third channel 1450, the fourth channel 1454 extending along the length of the first frame rail member 1404. The third channel 1450 may include an inner section 1464 and an outer section 1460, the inner section 1464 having a larger cross-sectional area than the outer section 1460.

As further illustrated in FIG. 14, the second frame rail member 1405 may include a third channel (or lower channel) 1451 extending along the length of the second frame rail member 1405 in the lower section 1427 of the second frame rail member 1405, and a fourth channel (or second intermediate channel) 1455 above the third channel 1451, the fourth channel 1455 extending along the length of the second frame rail member 1405. The third channel 1451 may include an inner section 1465 and an outer section 1461, the inner section 1465 having a larger cross-sectional area than the outer section 1461.

In the embodiment illustrated in FIG. 14, by way of example, the first channel (or upper channel) 1418 and the third channel (or lower channel) 1450 of the first frame rail member 1404 are both located on the second side 1410 of the first frame rail member 1404. Likewise, the first channel (or upper channel) 1419 and the third channel (or lower channel) 1451 of the second frame rail member 1405 are both located on the second side 1411 of the second frame rail member 1405. Thus, the respective first channels (or upper channels) 1418 and 1419 of the first and second frame rail members 1404 and 1405 face each other, and the respective the third channels (or lower channels) 1450 and 1451 of the first and second frame rail members 1404 and 1405 face each other. This configuration accommodates or facilitates the use of connector members described below in conjunction with FIG. 15; such connector members may be entirely located in the gap between the first and second frame rail members 1404 and 1405. This configuration is an alternative to the embodiment illustrated in FIG. 7, where the first and third channels 718 and 750 of the first frame rail member 704 are both located on the first side 706 of the first frame rail member 704, and the first and third channels 719 and 751 of the second frame rail member 705 are likewise both located on the first side 707 of the second frame rail member 705. The configuration illustrated in FIG. 7 accommodates or facilitates the use of connector members 900 described above in conjunction with FIGS. 9 and 10; such connector members 900 may wrap around upper and lower end portions of the first and second frame rail members 704 and 705 as described above and illustrated in FIG. 10.

Figure 15:
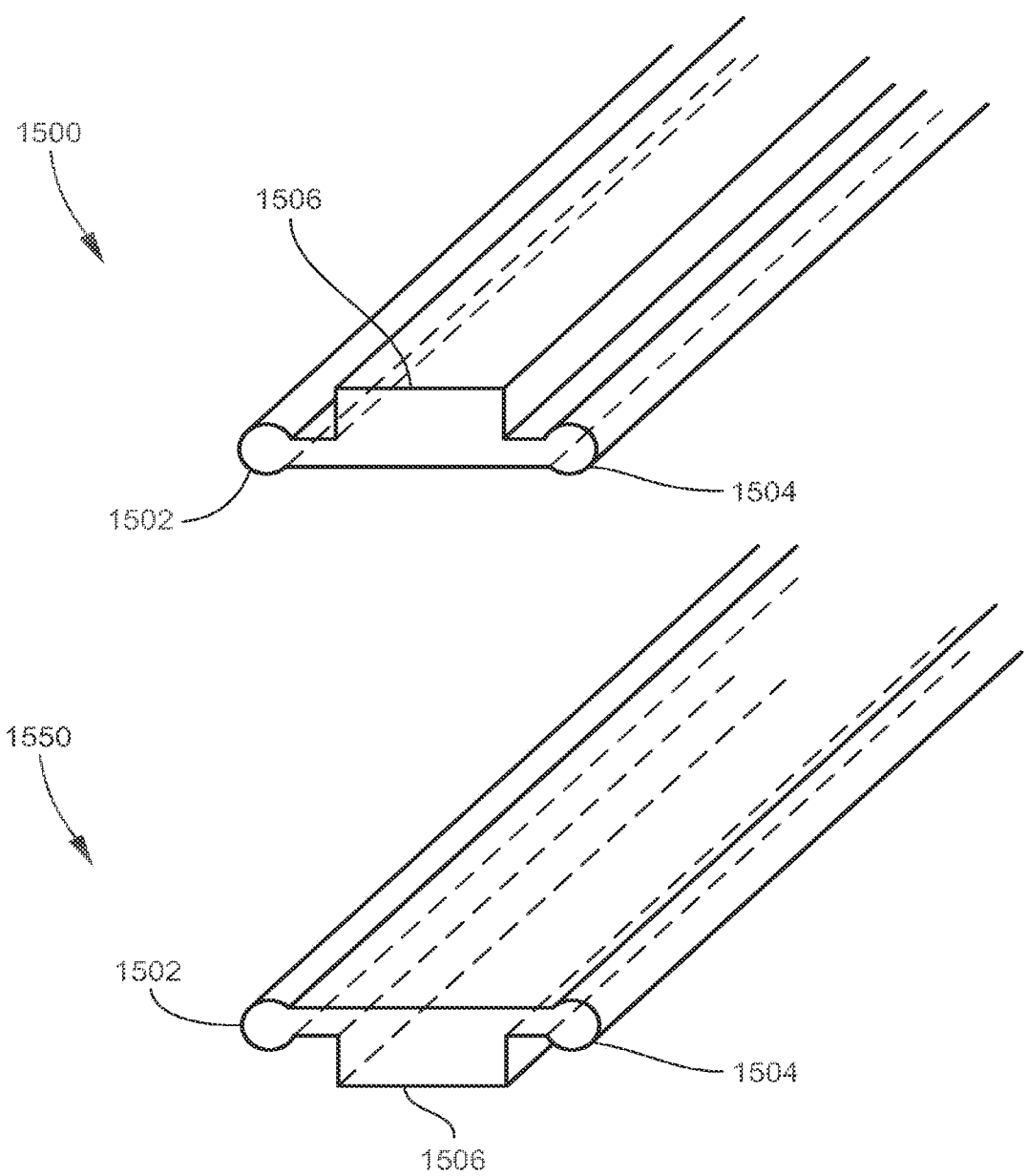
FIG. 15 is a perspective view of an example of an upper connector member and a lower connector member according to another embodiment.

FIG. 15 is a perspective view of an example of an upper (or first) connector member 1500 and a lower (or second) connector member 1550 according to another embodiment, which may be utilized in the interlocking frame rail system 1400 according to the present invention. One or both connector members 1500 and 1550 may be used to interlock the first frame rail member 1404 and the second frame rail member 1405 shown in FIG. 14. Each connector member 1500 and 1550 may include a first coupling member 1502 and a second coupling member 1504. The first coupling member 1502 and the second coupling member 1504 may extend continuously along the length of the connector member 1500 and 1550. An interlocking frame rail system 1400 according to the present embodiment may include the upper connector member 1500 only, or the lower connector member 1550 only, or both connector members 1500 and 1550. The upper connector member 1500 may extend along at least a portion of the length of the first frame rail member 1404 and at least a portion of the length of the second frame rail member 1405. The first coupling member 1502 of the upper connector member 1500 may extend through the first (or upper) channel 1418 of the first frame rail member 1404 in removable engagement therewith, and the second coupling member 1504 of the upper connector member 1500 may extend through the first (or upper) channel 1419 of the second frame rail member 1405 in removable engagement therewith. The first coupling member 1502 may be complementary in shape to the first channel 1418 of the first frame rail member 1404, and the second coupling member 1504 may be complementary in shape to the first channel 1419 of the second frame rail member 1405, thus limiting the upper connector member 1500 to longitudinal insertion into and removal from the first and second frame rail members 1404 and 1405.

Continuing with the present example, the lower connector member 1550 may likewise extend along at least a portion of the length of the first frame rail member 1404 and at least a portion of the length of the second frame rail member 1405. The first coupling member 1502 of the lower connector member 1550 may extend through the third (or lower) channel 1450 of the first frame rail member 1404 in removable engagement therewith, and the second coupling member 1504 of the lower connector member 1550 may extend through the third (or lower) channel 1451 of the second frame rail member 1405 in removable engagement therewith. The first coupling member 1502 may be complementary in shape to the third channel 1450 of the first frame rail member 1404, and the second coupling member 1504 may be complementary in shape to the third channel 1451 of the second frame rail member 1405, thus limiting the lower connector member 1550 to longitudinal insertion into and removal from the first and second frame rail members 1404 and 1405.

As further illustrated in FIG. 15, each connector member 1500 and 1550 may include a body or projection 1506 disposed between the first coupling member 1502 and the second coupling member 1504. In some embodiments, the body or projection 1506 may have a width (along the horizontal direction, from the perspective of FIG. 15) such that, when installed, the body or projection 1506 occupies all or substantially all of the width of the gap between the first and second frame rail members 1404 and 1405. In some embodiments, the body or projection 1506 may have a height (along the vertical direction, from the perspective of FIG. 15) such that, when installed, the body or projection 1506 is flush or substantially flush with the uppermost or lowermost end surfaces of the first and second frame rail members 1404 and 1405.

Other embodiments may include a combination of features illustrated in FIGS. 7, 9, 14 and 15. For example, an interlocking frame rail system may be configured to include an upper connector member as shown in FIG. 9 and a lower connector member as shown in FIG. 15. As another example, an interlocking frame rail system may be configured to include an upper connector member as shown in FIG. 15 and a lower connector member as shown in FIG. 9.

In general, terms such as "coupled to," and "configured for coupling to" and "secured to" and "in engagement with" (for example, a first component is "coupled to" or "is configured for coupling to" or is "secured to" or is "in engagement with" a second component) are used herein to indicate a structural, functional, mechanical, electrical, signal, optical, magnetic, electromagnetic, ionic or fluidic relationship between two or more components or elements. As such, the fact that one component is said to couple to a second component is not intended to exclude the possibility that additional components may be present between, and/or operatively associated or engaged with, the first and second components.

Figure 16:
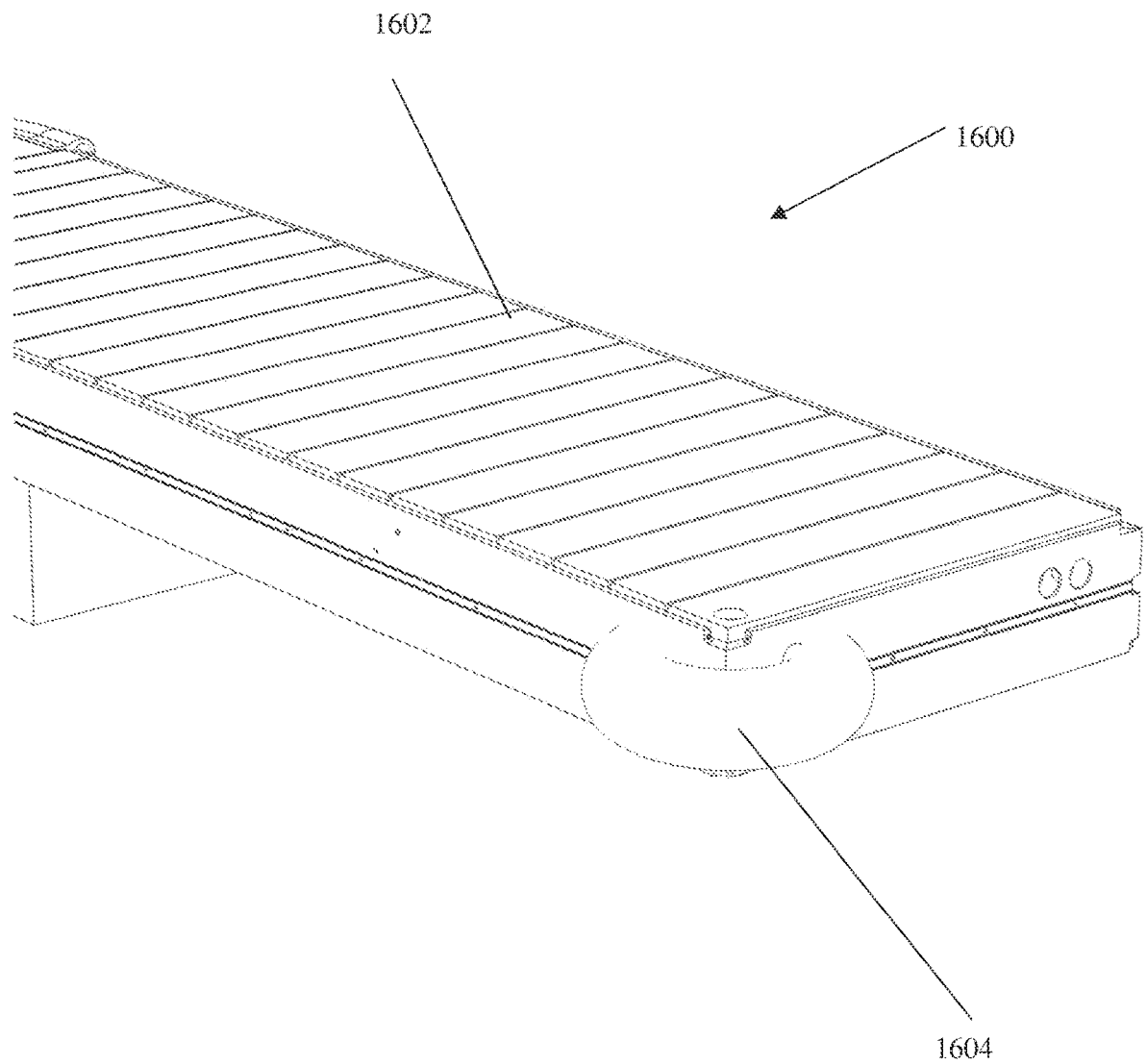
FIG. 16 is a perspective view of a boat dock structure according to another embodiment.

FIG. 16 is a perspective view of a boat dock structure 1600 in accordance with embodiments of the invention. The boat dock structure 1600 includes a boat dock 1602 and a wheel bumper 1604. The wheel bumper 1604 is shown in FIG. 16 integrated into a corner section of the boat dock structure 1600. The wheel bumper 1604 may be formed from materials conventionally used for boat dock wheel bumpers such as polyvinyl, polyethylene or other materials. The wheel bumper 1604 is configured to protect the boat dock structure 1600 and a boat from damage when a boat is docking at the boat dock structure 1600.

Figure 17:
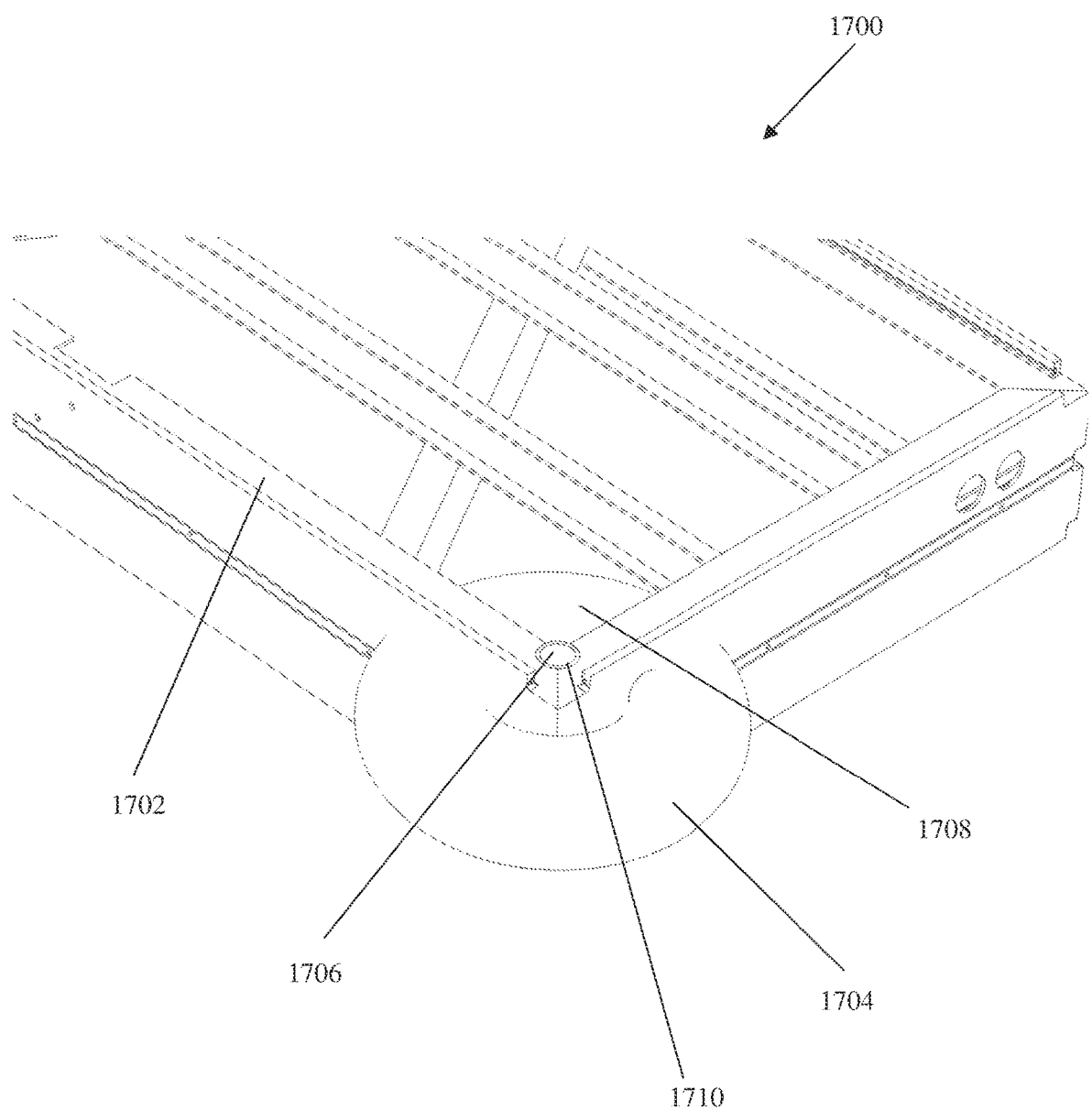
FIG. 17 is a perspective view of a boat dock structure according to another embodiment.

FIG. 17 is a partial perspective view of a boat dock structure 1700 in accordance with embodiments of the invention. The boat dock structure 1700 includes a boat dock 1702 and a wheel bumper 1704. FIG. 17 has the upper decking of the boat dock 1702 removed to further illustrate the wheel bumper 1704. The wheel bumper 1704 is a generally round shape, with a center of the wheel bumper 1704 at a corner 1706 of the boat dock 1702.

A portion 1708 of the wheel bumper is disposed within the structure of the boat dock structure 1702, with a remaining portion of the wheel bumper 1704 protruding from outer sides of the boat dock structure 1700 in the corner region, to provide protection to the boat dock structure and docking boats. In this embodiment, the wheel bumper 1704 is positioned between an upper portion and a lower portion of the boat dock structure 1700. A wheel bumper axle 1710 may be disposed in the corner section 1706 of the boat dock 1702.

Figure 18:
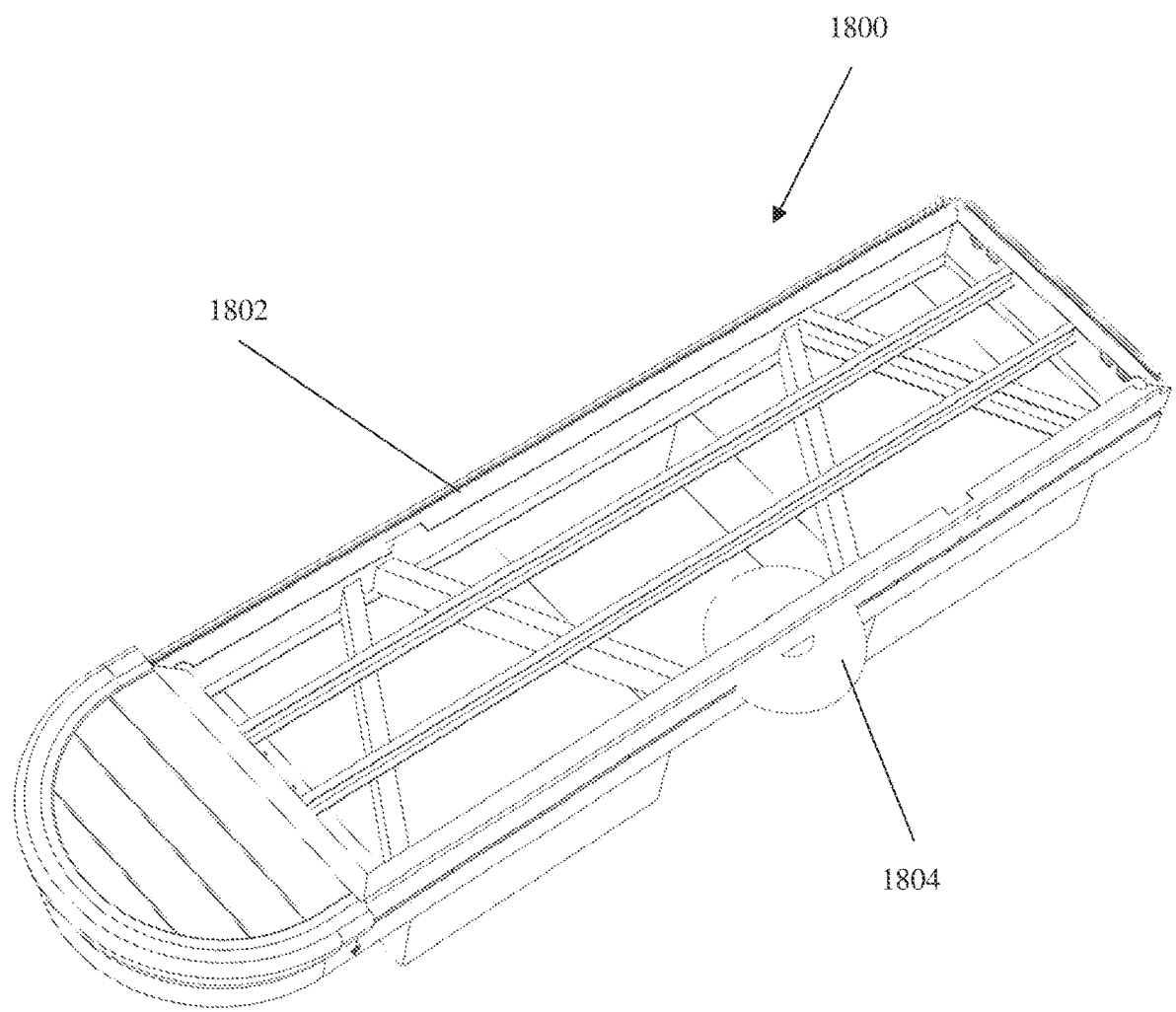
FIG. 18 is a perspective view of a boat dock structure according to another embodiment.

FIG. 18 is a perspective view of a boat dock structure 1800 in accordance with embodiments of the invention. The boat dock structure 1800 includes a boat dock 1802 and a wheel bumper 1804. FIG. 18 has the upper decking of the boat dock 1802 removed to further illustrate the wheel bumper 1804. In this embodiment, the wheel bumper 1804 is not positioned at a corner section, but is instead positioned along a length of the boat dock structure 1800. In this embodiment, the boat dock structure 1800 is shown with a rounded end portion.

Figure 19:
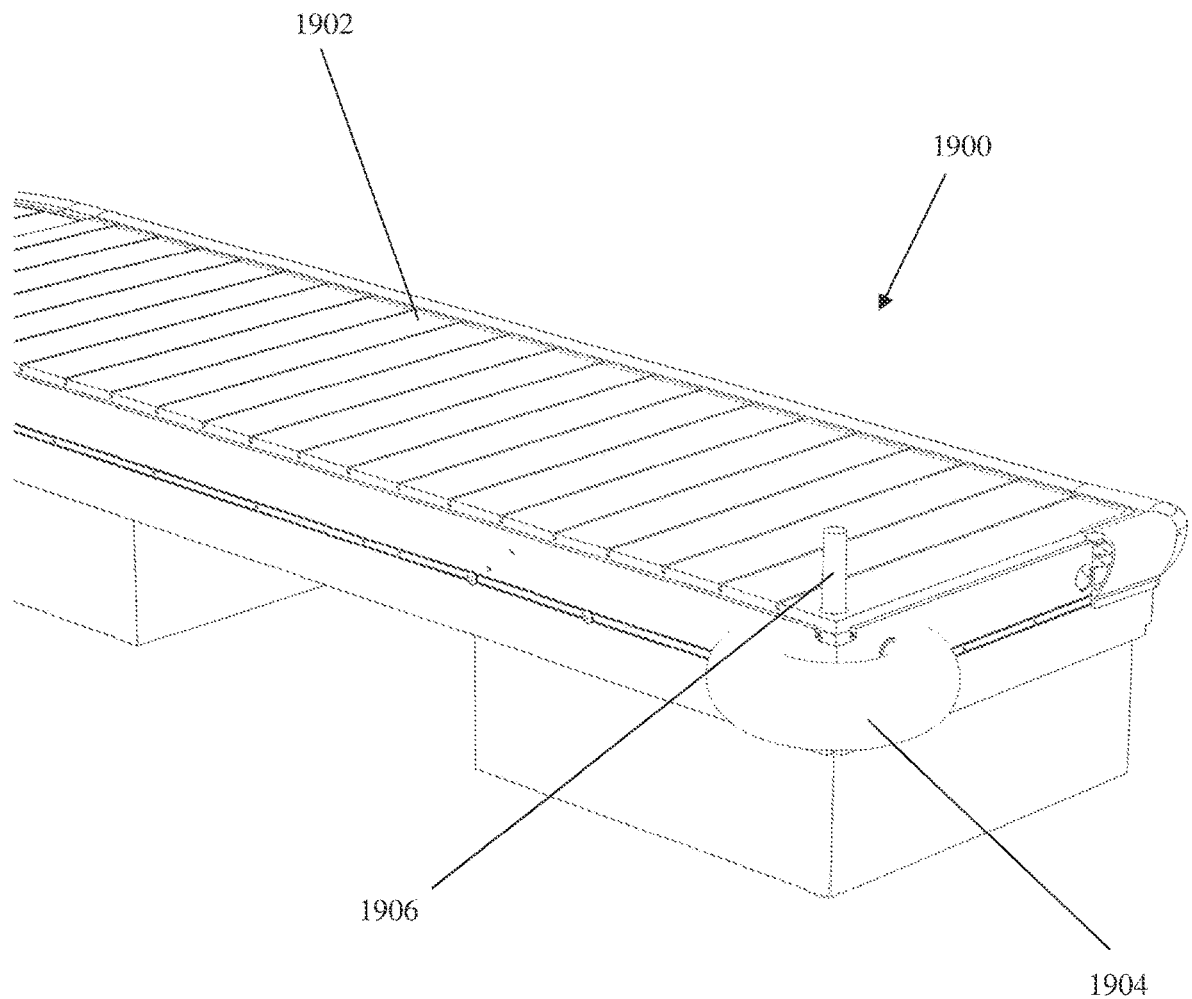
FIG. 19 is a perspective view of a boat dock structure according to another embodiment.

FIG. 19 is a partial perspective view of a boat dock structure 1900 in accordance with embodiments of the invention. The boat dock structure 1900 includes a boat dock 1902, a wheel bumper 1904 and a wheel bumper axle 1906. In this embodiment, the wheel bumper axle 1906 protrudes from a top portion of the boat dock 1902.

Figure 20:
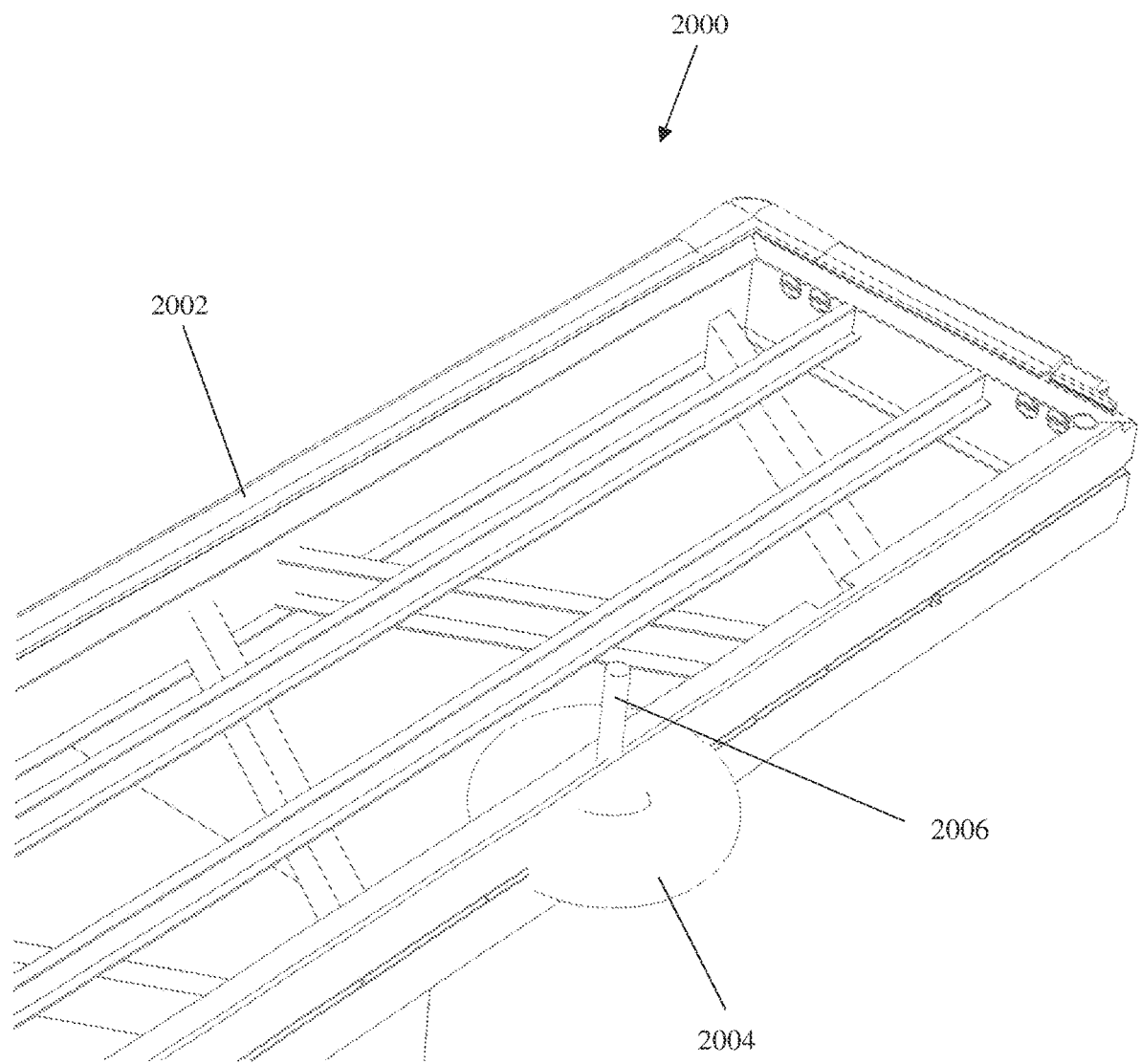
FIG. 20 is a perspective view of a boat dock structure according to another embodiment.

FIG. 20 is a perspective view of a boat dock structure 2000 in accordance with embodiments of the invention. The boat dock structure 2000 includes a boat dock 2002, a wheel bumper 2004 and a wheel bumper axle 2006. FIG. 20 has the upper decking of the boat dock 2002 removed to further illustrate the wheel bumper 2004 and a wheel bumper axle 2006. The wheel bumper 2004 is mounted to the boat dock structure 2000 and is centered around the wheel bumper axle 2006. In this embodiment, the wheel bumper axle 2006 protrudes from a top portion of the boat dock 2002.

Figure 21:
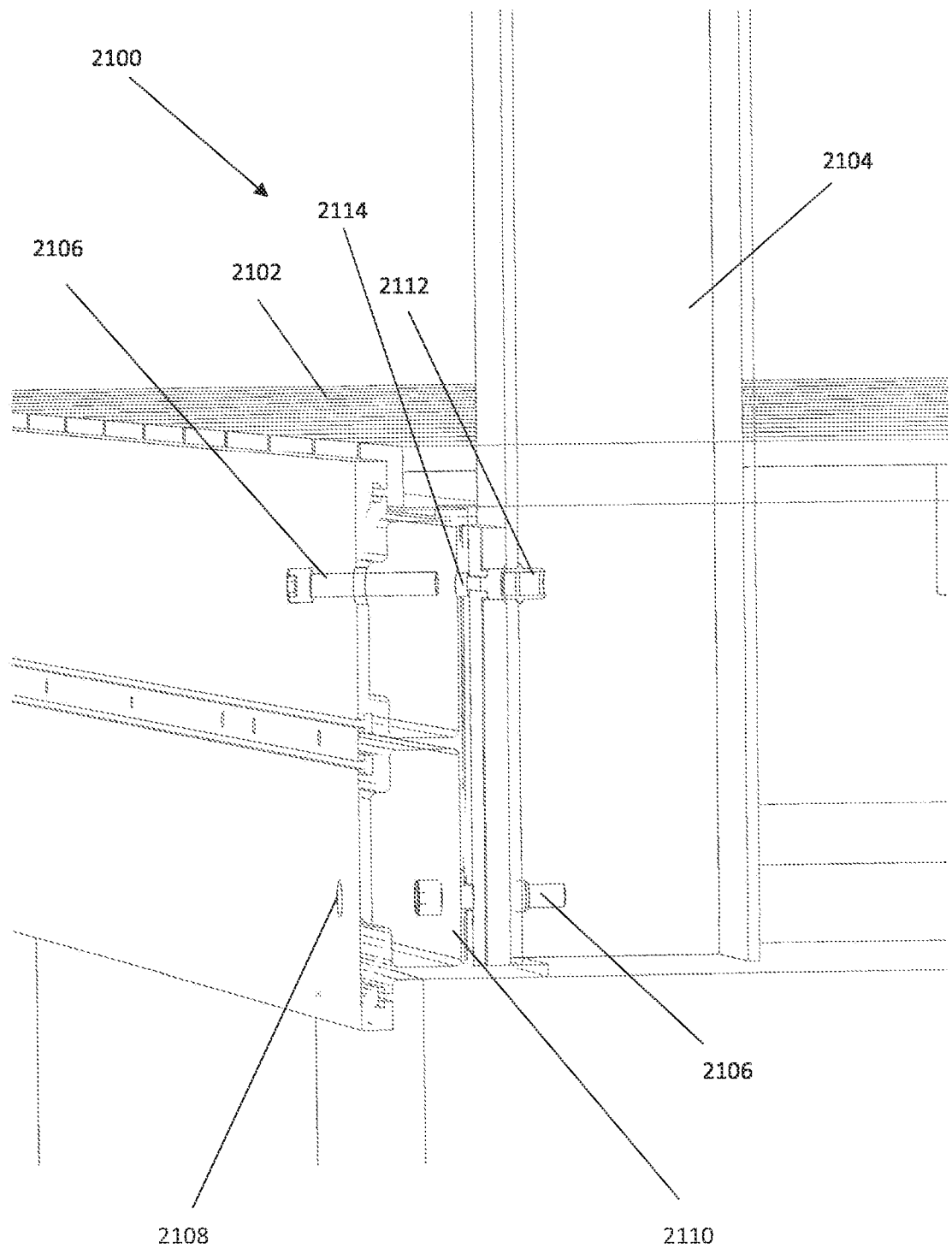
FIG. 21 is a perspective view of a boat dock structure according to another embodiment.

FIG. 21 is a perspective view of a boat dock structure 2100 in accordance with embodiments of the invention. The boat dock structure 2100 includes a boat dock 2102, with a frame rail 2110 attached to the boat dock 2102, and a canopy post 2104 attached to the boat dock 2102 and to the frame rail 2110.

The frame rail 2110 may be attached to the boat dock 2102 as shown in previous figures herein. The canopy structure 2104 is configured to be attached to the frame rail 2110 utilizing fasteners 2106 inserted through the access hole 2108 on an outer side of the frame rail assembly 2110 and into a hole 2114 on an inner side of the frame rail 2110. A rivet nut 2112 may be used to secure the fastener in place. The access holes 2108 may be formed with a diameter greater than a diameter of the head of the fastener 2106, so that the fastener 2106 may be inserted completely through the access hole 2108 on the outer side of the frame rail 2110, so the fasteners 2106 are not readily visible when fully inserted. The hole 2114 is formed with a smaller diameter than the head of the fastener, so that the head of the fastener 2106 can abut against the inner side of the frame rail 2110 when inserted. The upper fastener 2106 in FIG. 21 is illustrated being inserted through the access hole 2108, while the lower fastener 2106 in FIG. 21 is illustrated fully inserted and attached to the rivet nut 2112. Other types of fasteners could be used to connect the canopy structure 2104 to the boat dock 2102 and to the frame rail 2110, which could include (but are not limited to) tapped threads and/or thread inserts, etc. Furthermore, fasteners could be used to secure canopy posts from the outside/exterior frame of a boat dock, with or without the use of interlocking plates. For example, a single wall style frame rail could be used bolting from outside the frame rail without the use of access holes.

Figure 22:
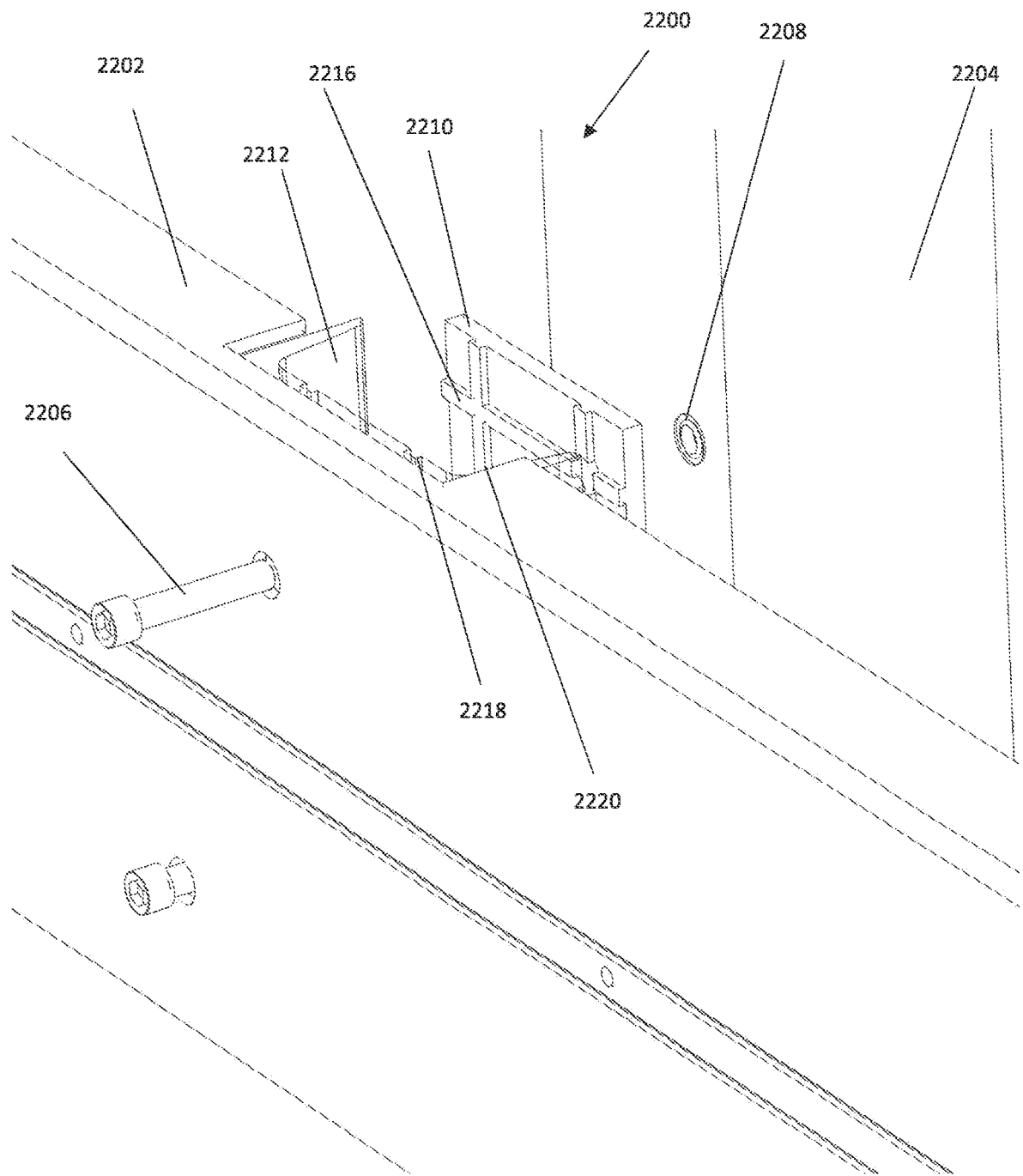
FIG. 22 is a cutaway perspective view of an alternative structure for connecting a frame rail to a canopy structure according to another embodiment.

FIG. 22 illustrates a cutaway perspective view of an alternative structure 2200 for connecting a frame rail 2202 to a canopy structure 2204. In this embodiment, the frame rail 2202 is again connected to the canopy structure 2204 utilizing fasteners connected to a rivet nut 2208 through access holes. The frame rail 2202 may have a cutout portion 2220 slightly wider than a width of the canopy structure 2204 to receive the canopy structure 2204 when the canopy structure 2204 is mated to the frame rail 2202. Additionally, to provide additional support, a female plate 2212 may be inserted within the cutout portion of the frame rail 2202, having a female keyway pattern 2218 formed thereon to mate with a male plate 2210 having a corresponding male keyway pattern 2216 formed thereon. The male plate 2210 and the female plate 2212 may both have holes formed therein to allow the fasteners 2206 to pass therethrough. Other types of interlocking plates could be used, such as ones having different keyed patterns, or having two separate female slotted plates and inserting separate pieces of key stock to provide interlocking functionality. Plate 2212 may be welded or otherwise secured to the frame rail 2202, and the male plate 2210 can be welded or otherwise secured to the canopy post 2204 prior to installation.

Figure 23:
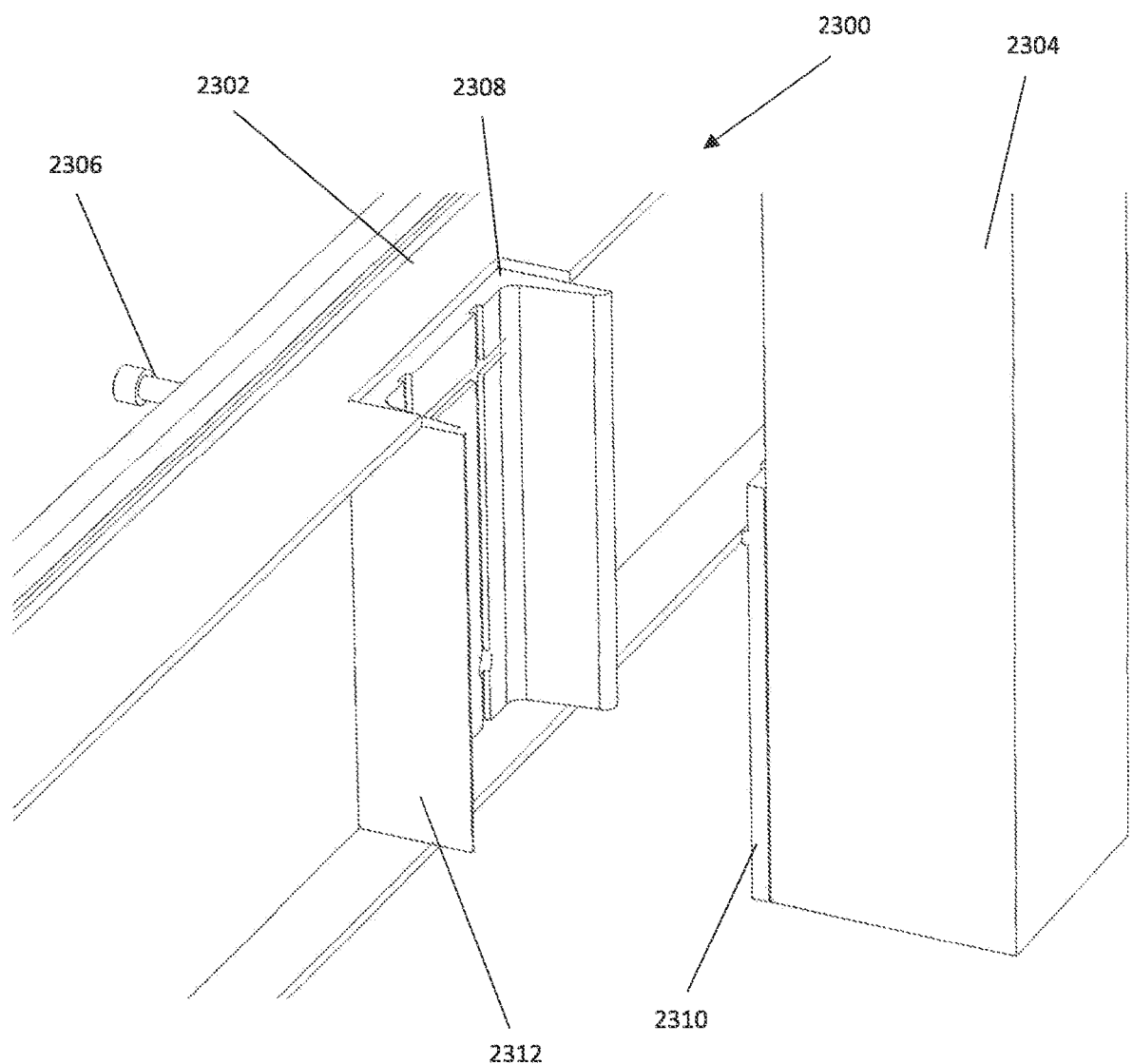
FIG. 23 is a cutaway perspective view of an alternative structure for connecting a frame rail to a canopy structure according to another embodiment.

FIG. 23 illustrates a cutaway perspective view of an alternative structure 2300 for connecting a frame rail 2302 to a canopy structure 2304. As in previous embodiments, a fastener 2306 is used to connect the frame rail 2302 to the canopy structure 2304. A female plate 2308 having a female keyway structure may be used with a male plate 2310 having a male keyway structure.

Additionally, the female plate 2308 may have side portions 2312 extending substantial perpendicular to a longitudinal direction of the frame rail 2302. The side portions may be spaced slightly wider than a width of the canopy structure 2304 so that the side portions can engage side portions of the canopy structure to provide additional support. Standard flat bar stock could be used, with male and female keyed plates without the added structural support provided, or even without the use of interlocking plates but instead have interlocking keyways, keyed directly into the canopy post itself, and keyed directly into the frame rail itself without the use of extra plates.

Figure 24:
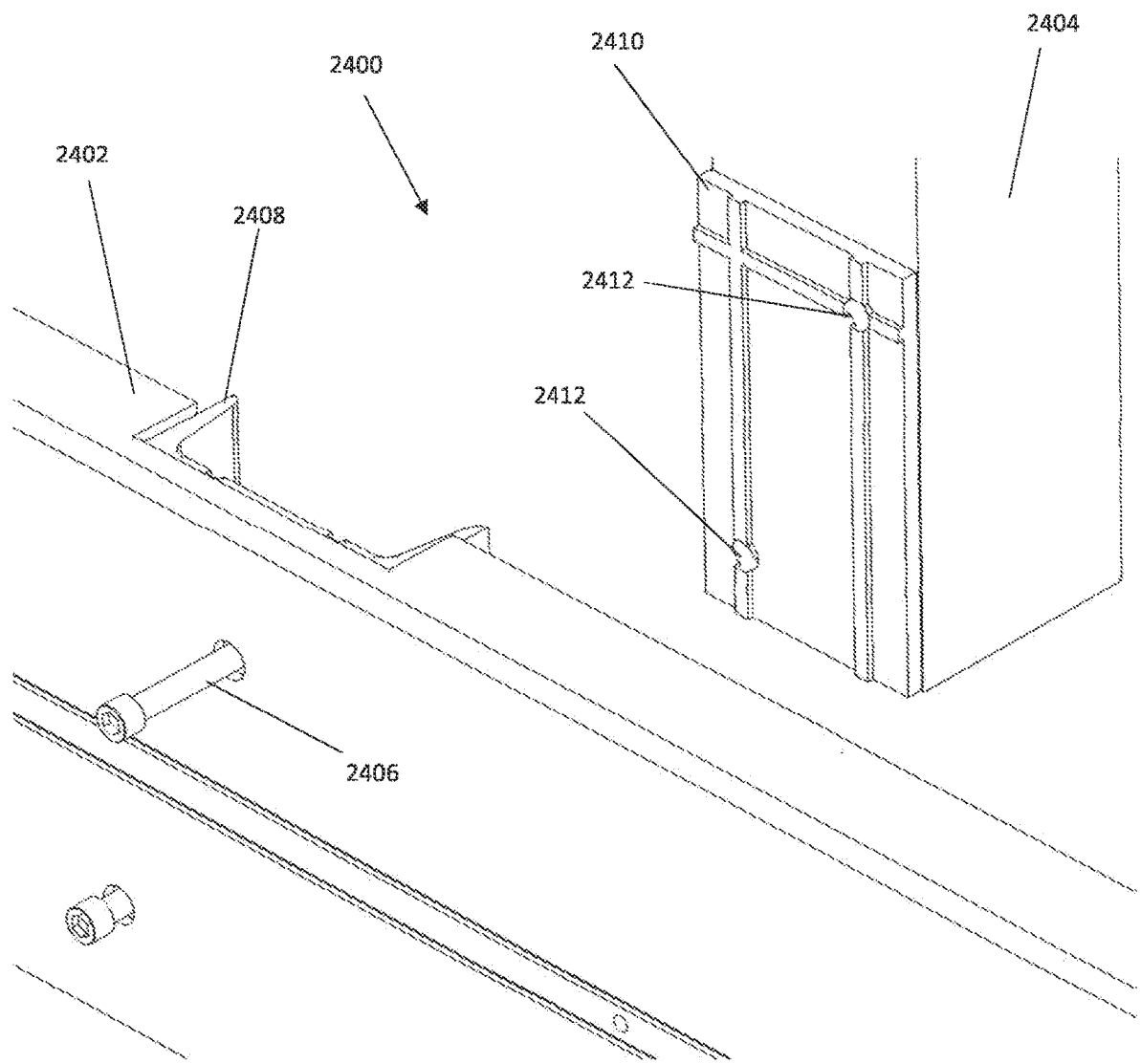
FIG. 24 is a cutaway perspective view of an alternative structure for connecting a frame rail to a canopy structure according to another embodiment.

FIG. 24 illustrates a cutaway perspective view of an alternative structure 2400 for connecting a frame rail 2402 to a canopy structure 2404. As in previous embodiments, fasteners 2406 are used to connect the frame rail 2402 to the canopy structure 2404. A female plate 2408 having a female keyway structure may be used with a male plate 2410 having a male keyway structure. Holes 2412 are placed in the male and female plates to allow access by the fasteners 2406. The holes may be placed at locations intersecting with a protruding portion of the keyway structure of the male and female plates 2408, 2410 as shown in FIG. 24. Alternatively, the holes may be placed at other locations on the male and female plates 2408, 2410. The canopies illustrated herein may include a roof (not shown). The canopy roof may be connected to the canopy structure (or canopy posts) using any of the connection methods disclosed herein for connecting the canopy structures to the frame rails, i.e., fasteners, male and female plates, keyway structures, etc.

Figure 25:
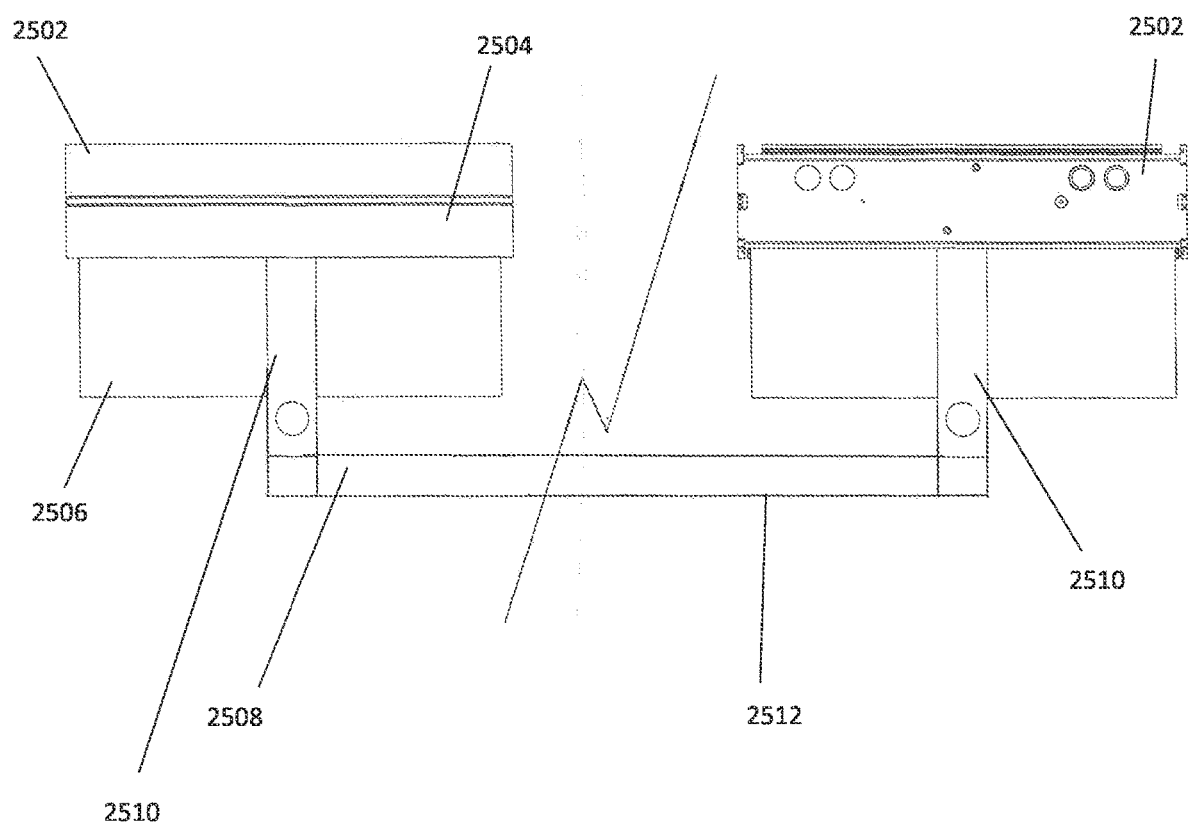
FIG. 25 is a structure for stabilizing two boat dock structures according to another embodiment.

FIG. 25 illustrates structure for stabilizing two boat dock structures. The boat dock structures 2502 having floats 2506 are connected together with a boat dock stabilizing structure 2508. The boat dock stabilizing structure 2508 may include structures 2510 extending downward from the boat dock structures 2502 and a connecting portion 2512 extending in a generally horizontal direction between the structures 2510 and connecting the structures 2510 together. Connection of the boat dock stabilizing structure 2508 to the boat dock structures 2502 may be done in the same ways the canopy structure is connected to the boat dock structures described above in connection with FIGS. 21-24, using frame rails, fasteners, interlocking structures such as the keyway structures, etc.

Figure 26:
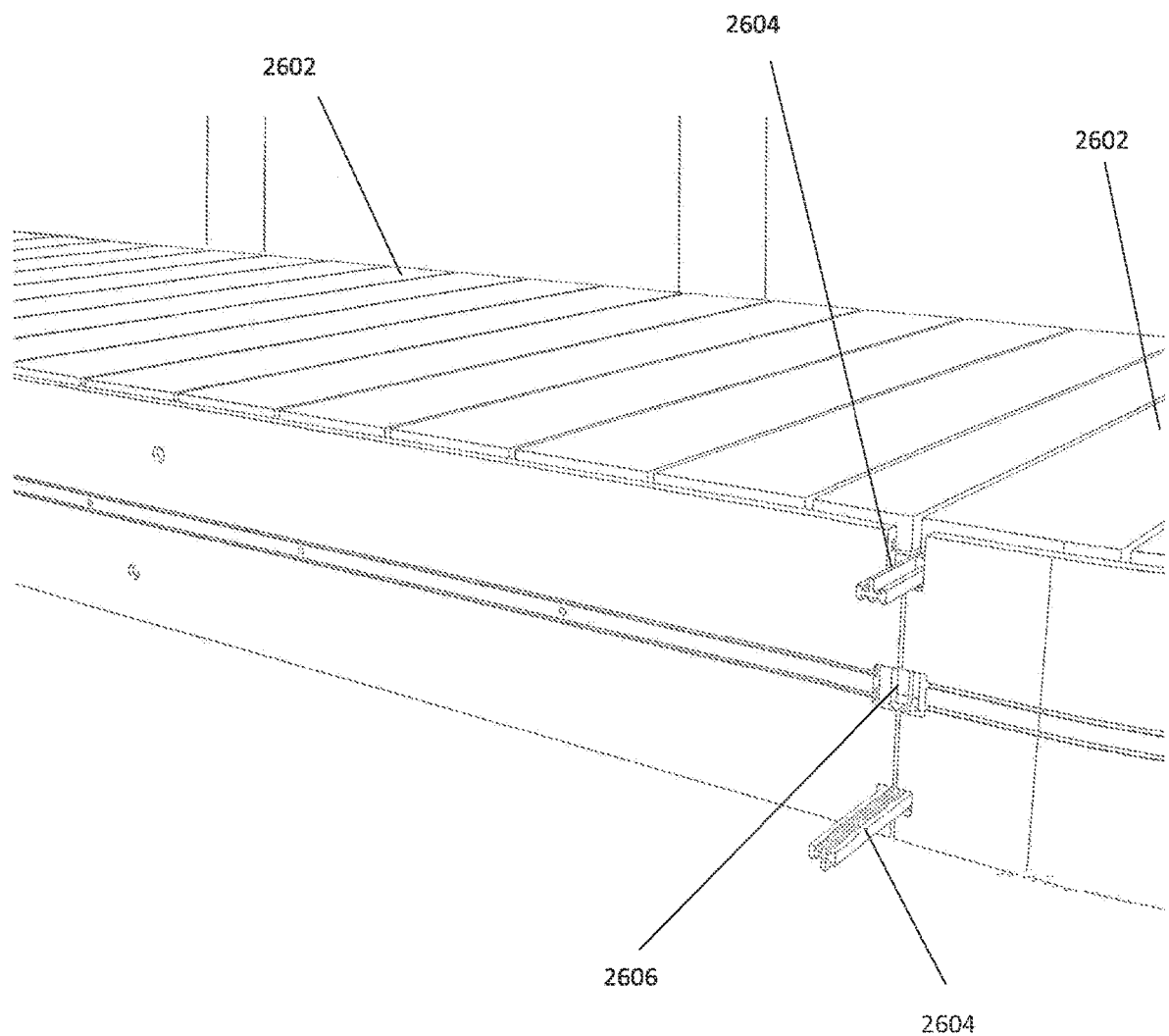
FIG. 26 is a perspective view of structure for connecting two pier sections together according to another embodiment.

FIG. 26 illustrates structure for connecting two pier sections 2602 together. The pier sections 2602 are connected together in this embodiment using second side couplers 2604, which have a shape configured to be complementary to channels formed in the end of the pier sections 2602. A shear pin 2606 may also be used extending from an end face of one of the pier sections 2602 into a hole in the other pier section 2602.

Figure 27:
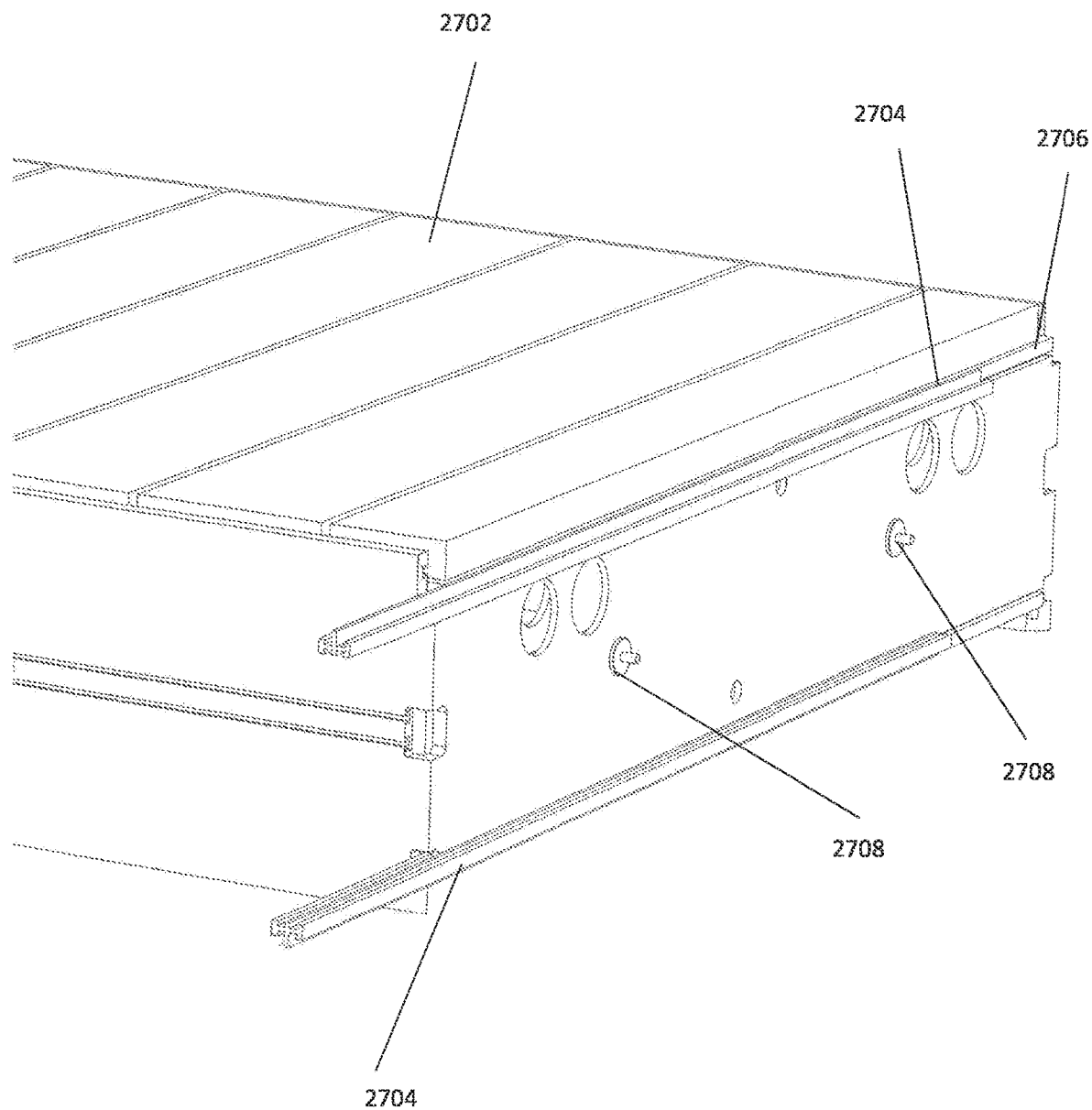
FIG. 27 is a perspective view of a pier structure according to another embodiment.

FIG. 27 illustrates a perspective view of a pier structure 2702, with a side face unconnected. The side face of the pier structure 2702 has channels 2706 formed therein for receipt of the second side couplers 2704, which are illustrated partially slid into the channels 2706. Shear pins 2708 extend outward from the side face of the pier structure 2702. Although not shown in FIG. 27, a typical pier may include a railing and be mounted to a piling or posts or other permanent structure extending from land out over water.

Figure 28:
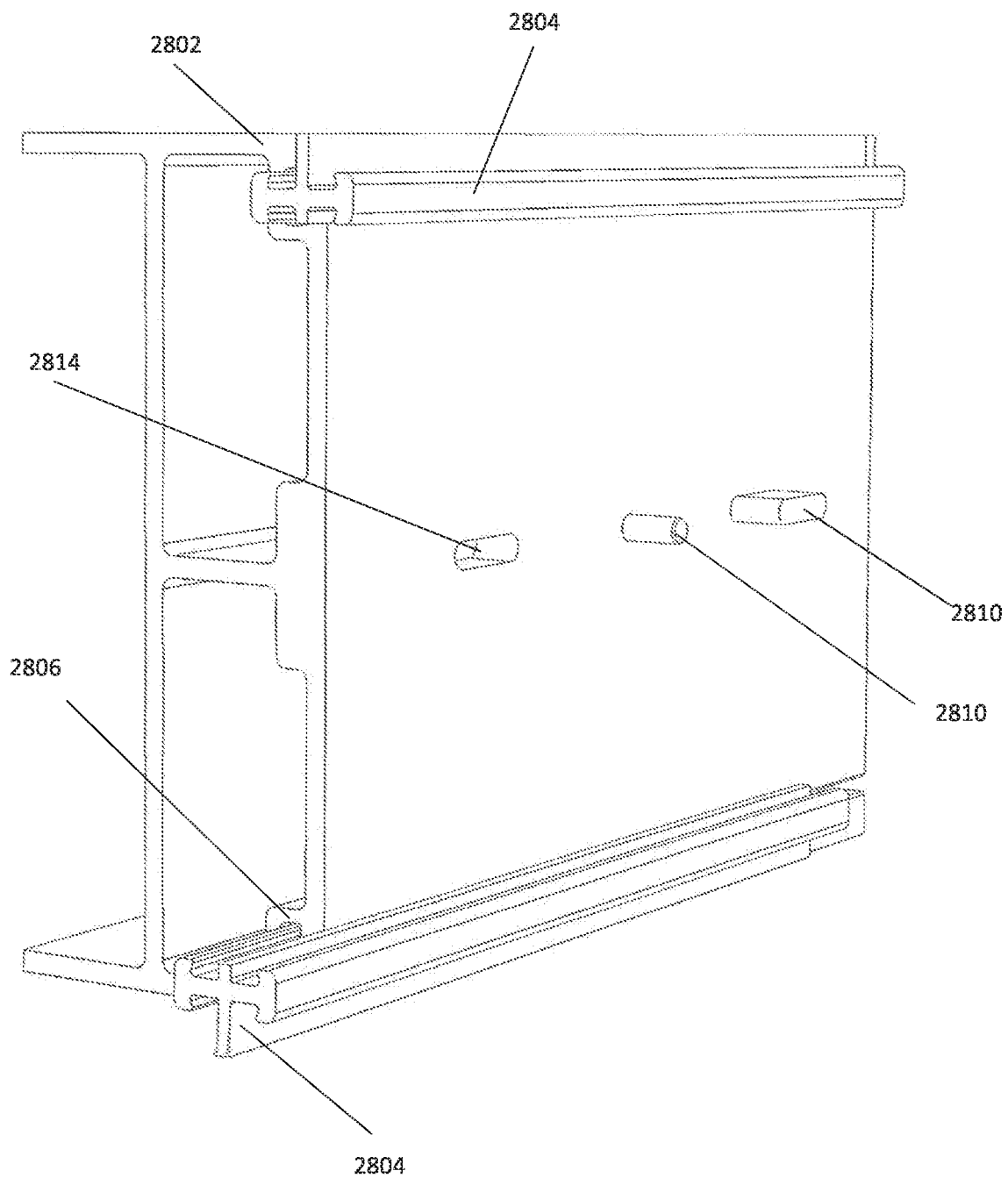
FIG. 28 is a perspective view of a frame rail member according to another embodiment.

FIG. 28 illustrates a frame rail member 2802, which can be attached to a pier section. Second side couplers 2804 are slid into the channels 2806. Shear pins 2810 (of two different shapes are included for connection to holes in an oppositely placed frame rail member. A hole 2814 is present for receiving a shear pin from an oppositely placed frame rail member.

Figure 29:
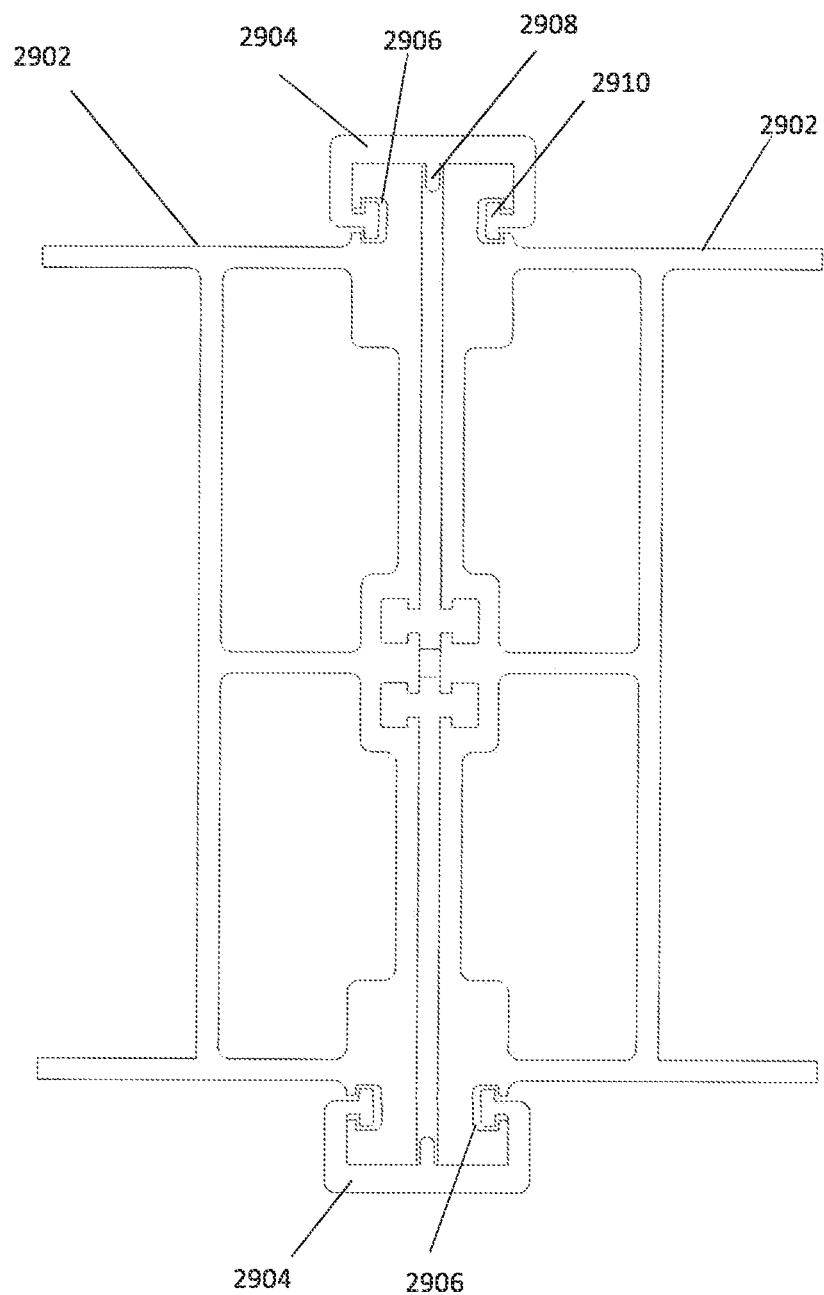
FIG. 29 is a perspective view of two frame rail pier assemblies according to another embodiment.

FIG. 29 illustrates two frame rail pier assemblies 2902 connected together. Each frame rail assembly has a pair of first side channels 2906 configured to receive end portions 2910 of the first side couplers 2904. The end portions 2910 of the first side couplers 2904 have a complementary shape to the first side channels so that the end portions 2910 may slide into the first side channels 2906. A protruding portion 2908 of the first side couplers 2904 is configured to slide into a space between the frame rail assemblies 2902.

Figure 30:
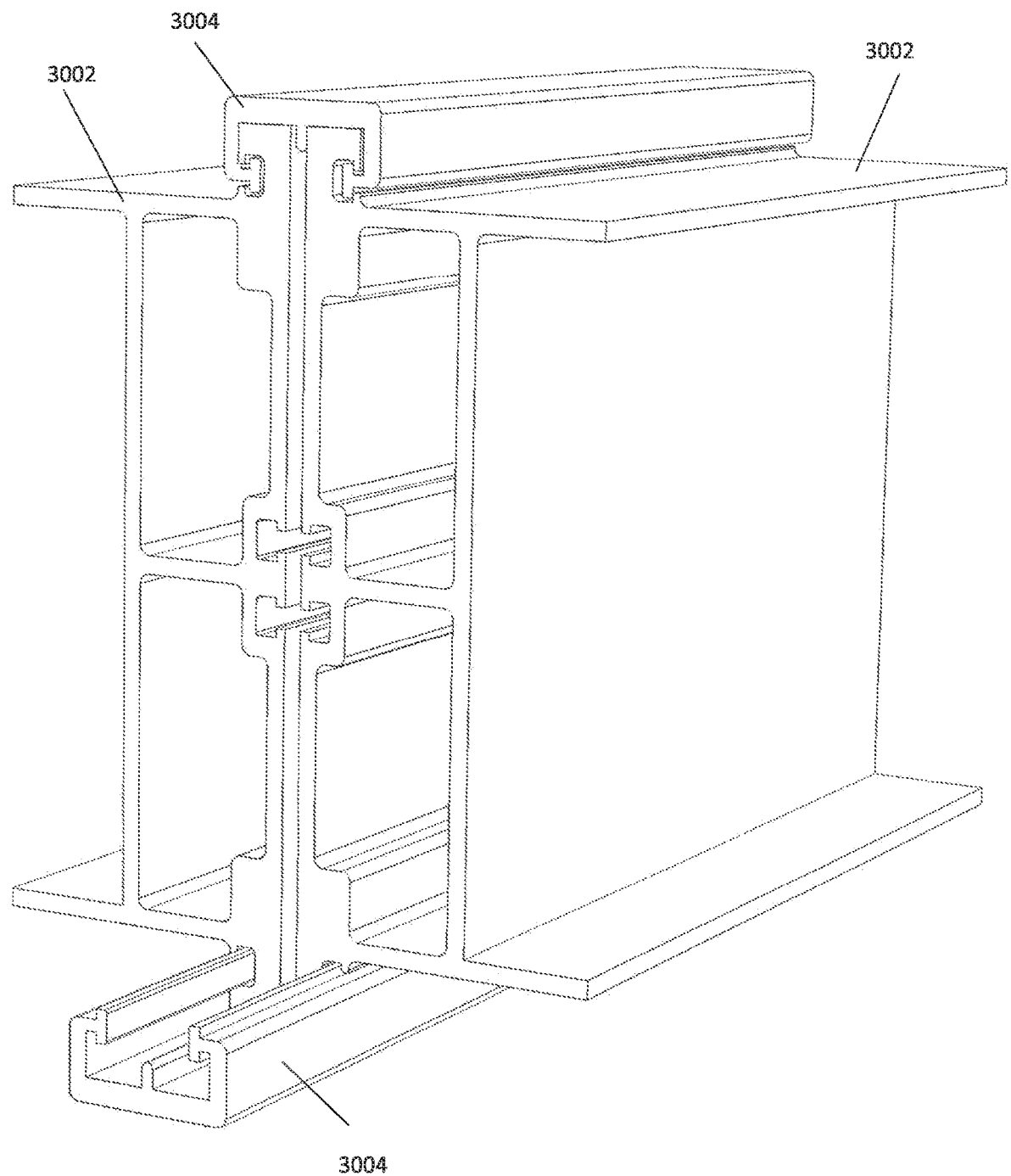
FIG. 30 is a perspective view of two frame rail pier assemblies according to another embodiment.

FIG. 30 illustrates a perspective view of two frame rail assemblies 3002 partially connected together with first side couplers 3004. The lower one of the first side couplers is shown partially slid into the first side channels.

Figure 31:
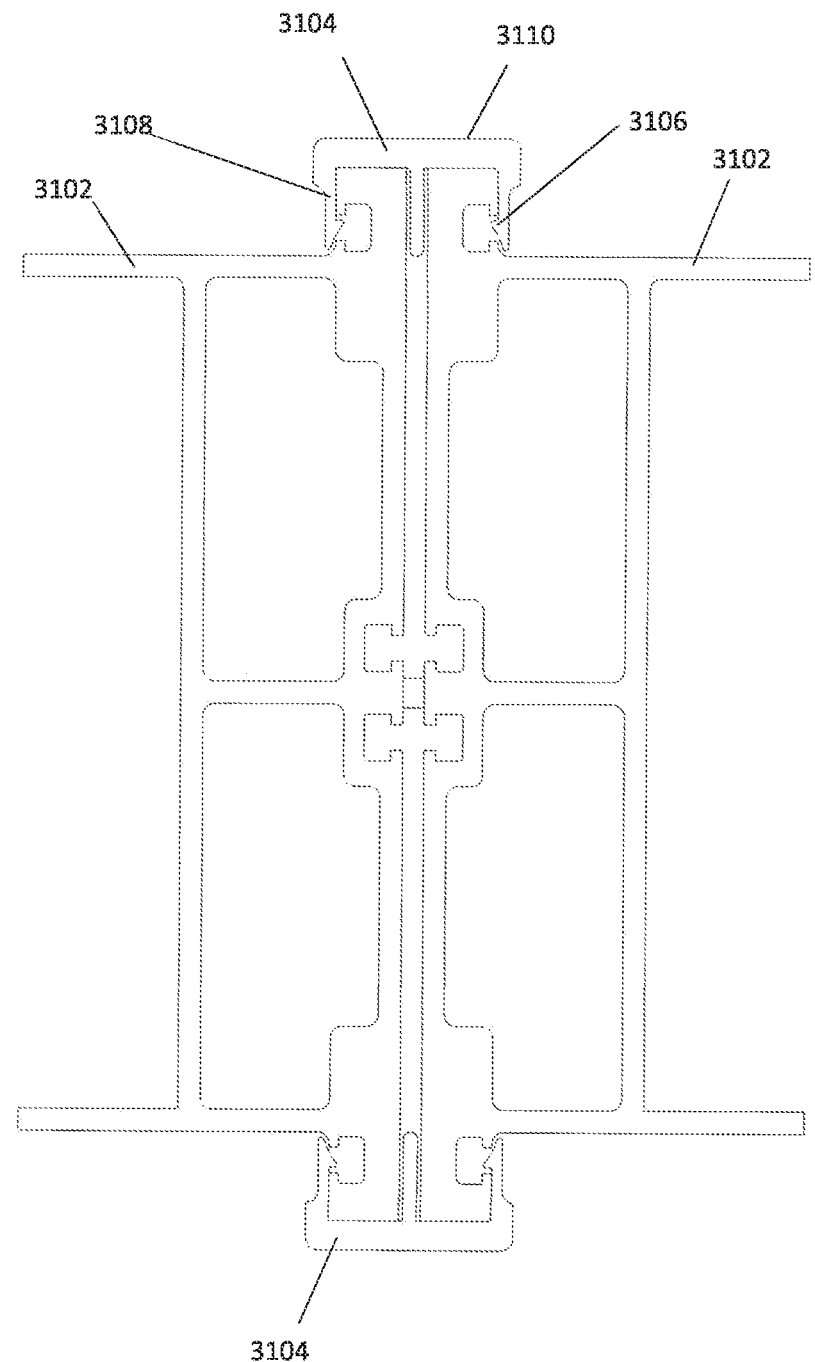
FIG. 31 is a side view of two frame rail pier assemblies according to another embodiment.

FIG. 31 illustrates a side view of two frame rail assemblies 3102 connected together with snap coupler members 3104 having an alternative structure to the connecting members 3004 of FIG. 30. In particular, the snap coupler members 3104 have a notch portion 3106 configured to fit within the first side channels of the frame rail assemblies 3102. The connector members 3104 may also include a reduced width portion 3108 between the notch portion 3106 and an end portion 3110 of the snap coupler members 3104. The reduced width portions 3108 are configured to give additional flexibility so that the notch portions can snap into place in the first side channels when slid on from an upper or lower vertical direction.

Figure 32:
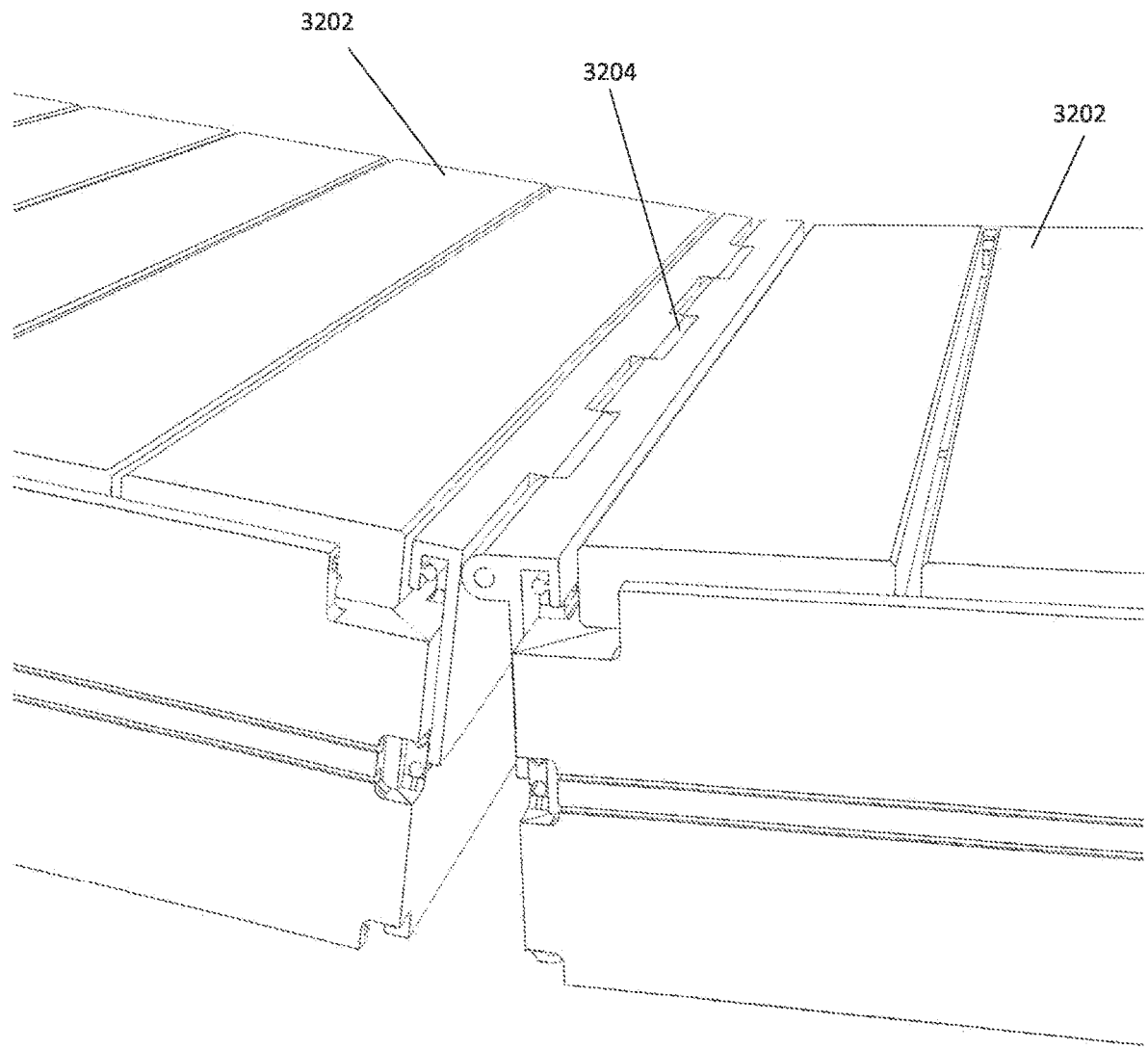
FIG. 32 is a perspective view of two boat docks connected together according to another embodiment.

FIG. 32 illustrates two boat docks 3202 connected together using a hinge structure. In particular, a piano-style hinge 3204 may be used to connect the two boat docks 3202. The piano-style hinge may have a slide in structure, although other hinge structures could be used.

Figure 33:
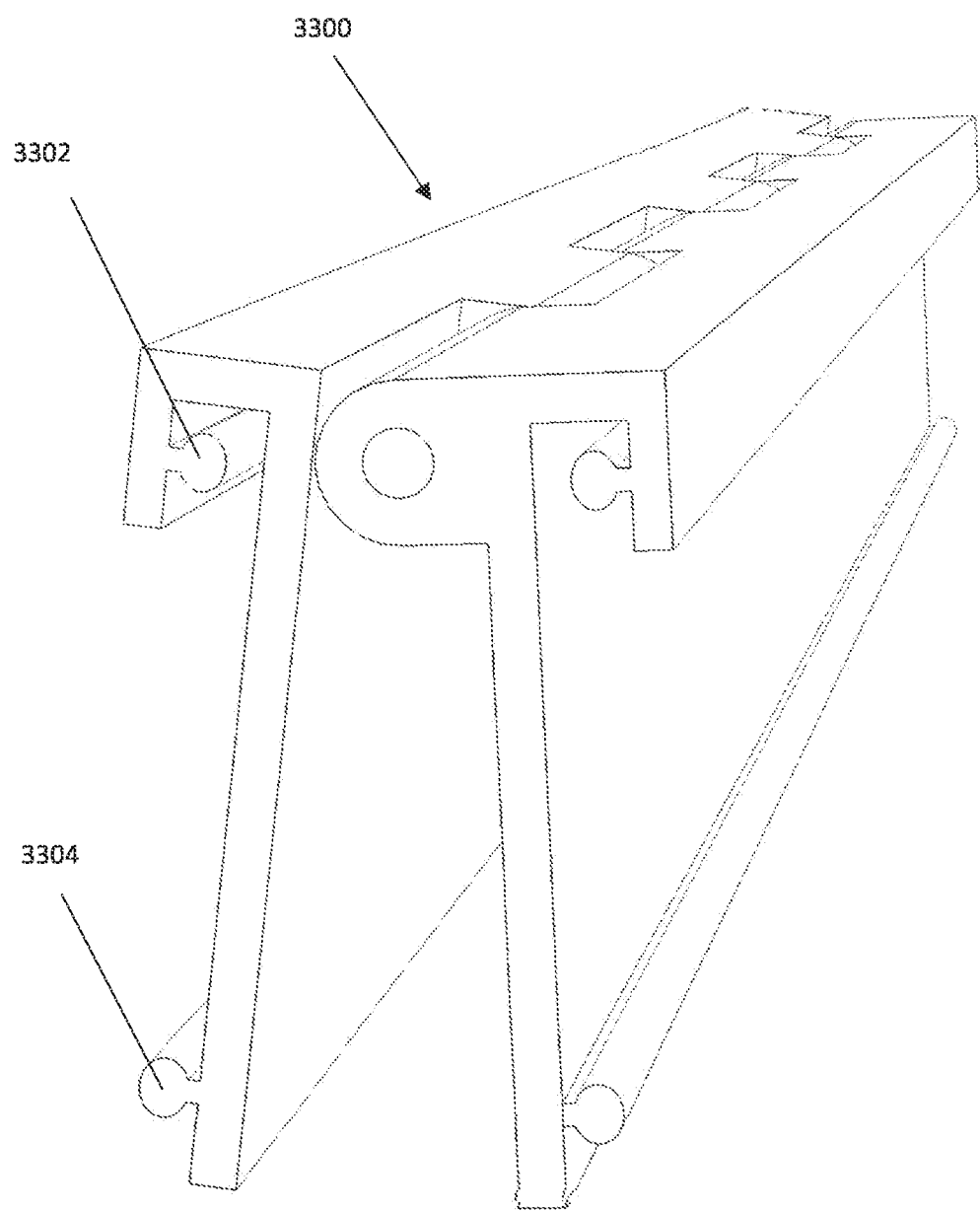
FIG. 33 is a perspective view of a piano-style hinge according to another embodiment.

FIG. 33 illustrates the piano-style hinge 3300 in further detail, unconnected from a boat dock or pier sections. The piano-style hinge 3300 may have a first coupling member 3302 and a second coupling member 3304 for connecting to corresponding channels of a frame rail member, in a manner similar to that shown in FIGS. 4 and 5. This allows easy connection of the hinge to frame rail members to connect two boat docks, two pier sections, or gangway sections to the pier.

Figure 34:
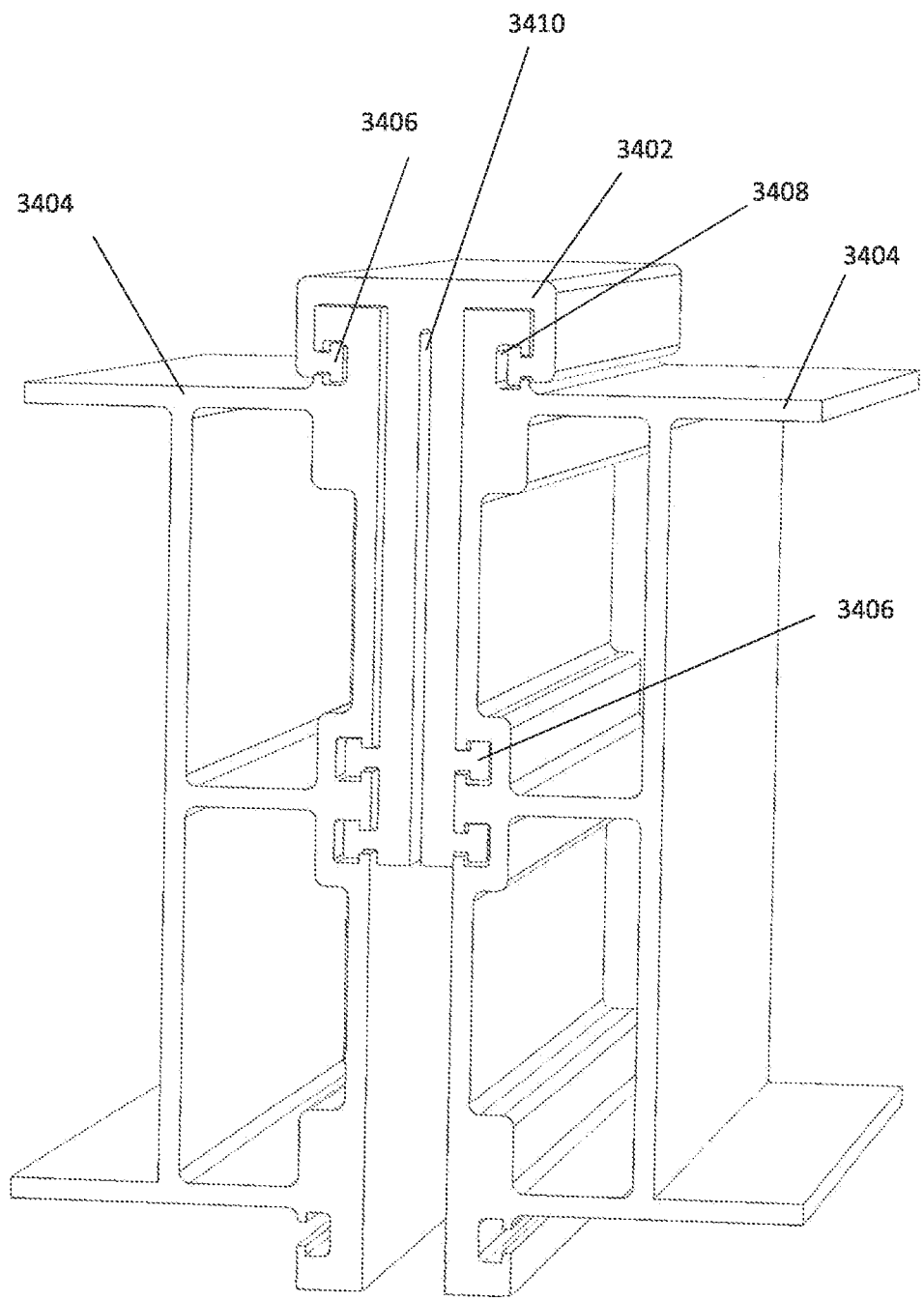
FIG. 34 is a perspective view of a elastic hinge according to another embodiment.

FIG. 34 illustrates an elastic hinge member 3402 that may be used to connect two frame rail members 3404 together. The elastic hinge member 3402 may be made from rubber or another elastic material. The elastic hinge member 3402 coupling members 3406 for sliding into channels 3408 in the frame rail members 3404. A gap 3410 in the elastic hinge member may be provided to increase or minimize flexibility of the hinge.

Figure 35:
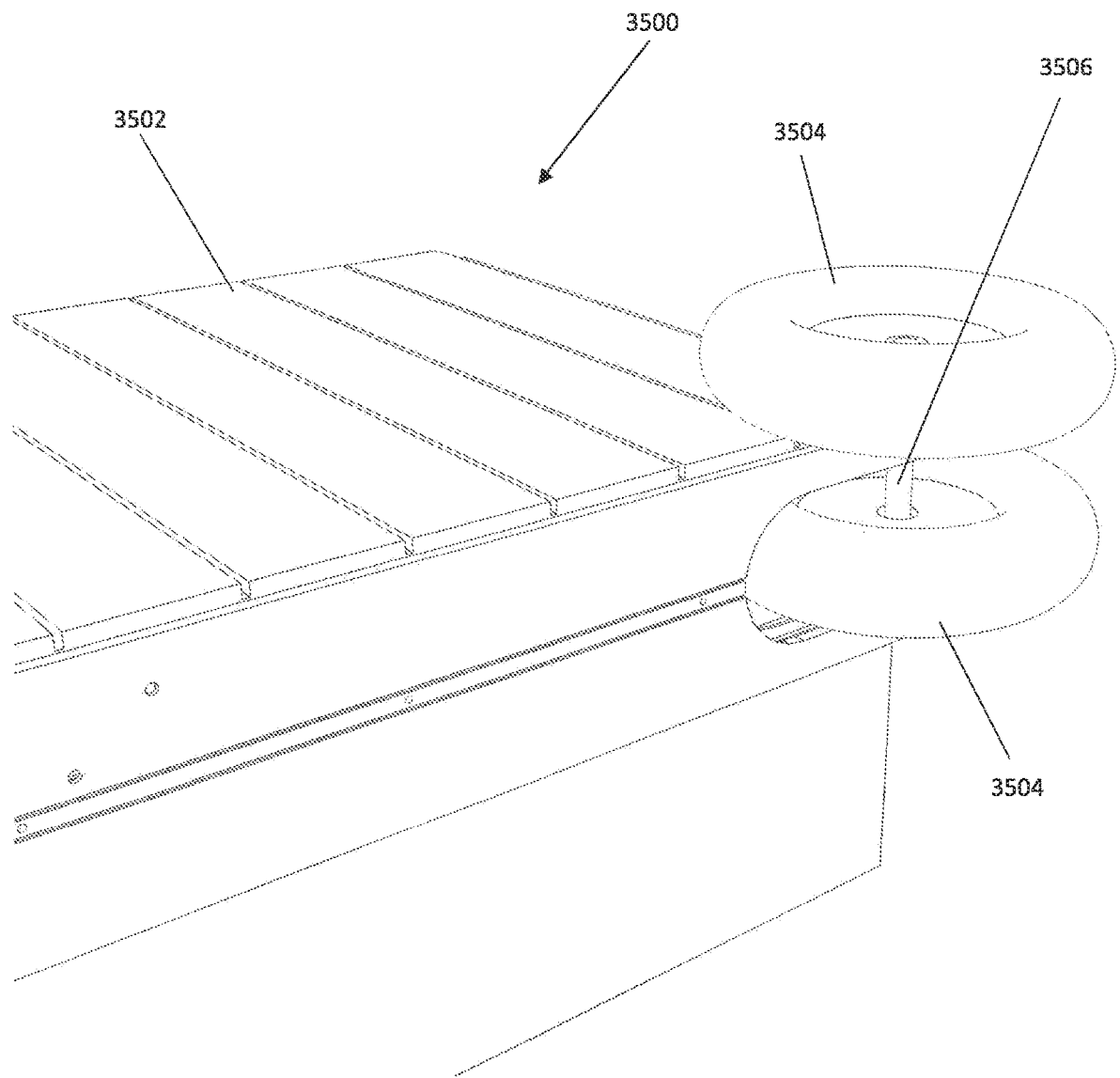
FIG. 35 is a perspective view of a boat dock structure according to another embodiment.

FIG. 35 is a perspective view of a boat dock structure 3500 in accordance with embodiments of the invention. The boat dock structure 3500 includes a boat dock 3502 and wheel bumpers 3504. The wheel bumpers 3504 are shown in FIG. 35 integrated into a corner section of the boat dock structure 3500. The wheel bumpers 3504 may be mounted about a post 3506 integrated into the boat dock structure 3500.

The lower wheel bumper 3504 may be integrated into the boat dock structure 3500 in a manner similar to that described above in conjunction with FIGS. 16-20. The upper wheel bumper is positioned to sit on top of or above the boat dock structure 3500, and may be held in place by the post 3506, which also extends above the boat dock structure 3500. The wheel bumpers 3504 are configured to protect the boat dock structure 3500 and a boat from damage when a boat is docking at the boat dock structure 3500. Additional wheel bumpers may be used positioned above or below the wheel bumpers 3504 shown in FIG. 35, positioned above, below or integrated into the boat dock structure.

Figure 36:
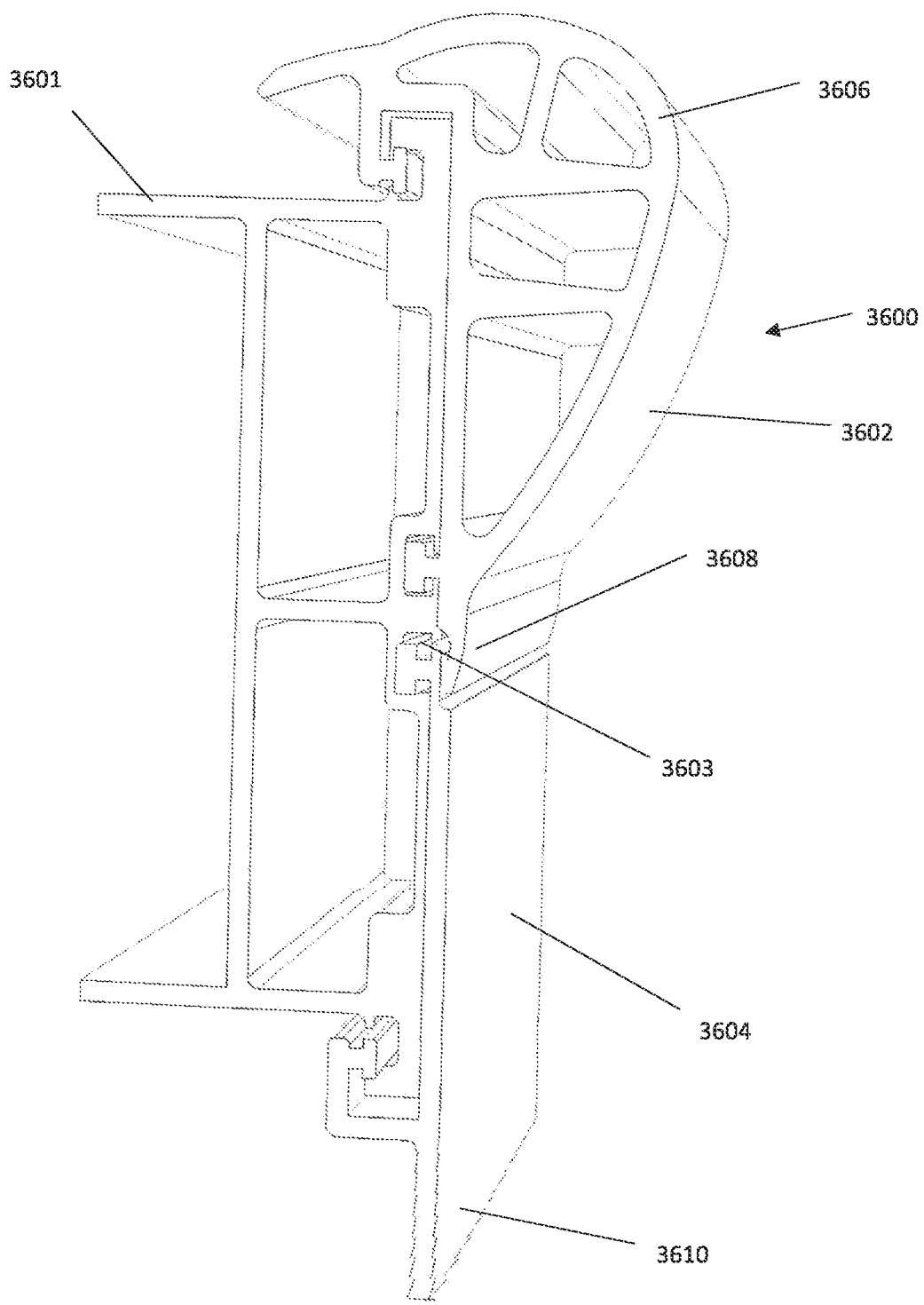
FIG. 36 is a perspective view of a frame rail assembly according to another embodiment.

FIG. 36 is a view of a portion of another implementation of a frame rail assembly 3600 according to embodiments of the present invention. The frame rail assembly 3600 may generally include a frame rail member 3601, a first removable rub-rail member 3602, and a second removable rub-rail member 3604. The frame rail assembly 3600 is similar to the frame rail assembly 600 of FIG. 6 in that the frame rail member 3601 includes channels 3603 for connecting to the connecting members of the first and second rub-rail members 3602, 3604.

The first removable rub-rail member 3602 may include an outer bumper shell 3606 projecting outward from the side of the rub-rail member 3602 with inner ribs. The frame rail member 3601 may be configured to accommodate one rub-rail member, or a plurality of nib-rail members. For example, in one implementation, the second rub-rail member 3604 may be removed from the frame rail assembly 3601. The first rub-rail member 3602 may be configured such that the outer bumper shell 3606 has an extended portion 3608 that may extend below the channel 3603, so as to cover, or partially cover the channel 3603 when the second rub-rail member 3604 is not used.

The second rub-rail member 3604 may be configured to have a flat outer surface, without an outer bumper shell, in contrast to the embodiment of FIG. 6. This allows the frame rail assembly 3601 and any associated parts to be hidden from view. Additionally, the second rub-rail member 3604 may have an extended portion 3610 extending downwards from the boat dock frame to provide added protection thereto.

The foregoing description of implementations has been presented for purposes of illustration and description. It is not exhaustive and does not limit the claimed inventions to the precise form disclosed. Modifications and variations are possible in light of the above description or may be acquired from practicing embodiments of the invention. The claims and their equivalents define the scope of the invention.

The invention claimed is:

1. A mounting configuration for of a boat dock, comprising:
   a boat dock having a deck and at least one side;
   a vertically extending support connected to said boat dock and extending vertically upwardly above said deck, said vertically extending support having a first side which faces away from said boat dock;
   a frame rail, said frame rail having a front side facing away from said boat dock and an opposing rear side facing towards said first side of said vertically extending support, a fastener opening extending through said frame rail from said front side to said rear side, a first interlocking element associated with said frame rail, a second interlocking element associated with said vertically extending support, said first and second interlocking elements connecting said frame rail and said vertically extending support when said vertically extending support is positioned between said boat dock and said frame rail and said frame rail is connected to said vertically extending support by at least one fastener which is located in said fastener opening.

2. The mounting configuration in accordance with claim 1, wherein said frame rail further comprises a rub rail mount which is configured to accept at least a portion of a rub rail and mount said rub rail so that at least a portion of said rub rail is located at said front side of said frame rail opposite said vertically extending support, and extends over said fastener opening.

3. The mounting configuration in accordance with claim 1, wherein said front side of said frame rail is spaced from said rear side and said fastener opening comprises a first opening in said front side and a second opening in said rear side.

4. The mounting configuration in accordance with claim 3, wherein said first opening has a first size which permits said fastener to pass therethrough and said second opening has a second size which is less than said first size and which does not permit said fastener to extend entirely therethrough.

5. The mounting configuration in accordance with claim 2, wherein said rub rail mount comprises a least one channel.

6. The mounting configuration in accordance with claim 5, wherein said at least one channel is located in said front side of said frame rail.

7. The mounting configuration in accordance with claim 1, wherein said rear side of said frame rail defines an inset for receiving at least a portion of said vertically extending support.

8. The mounting configuration in accordance with claim 7, wherein a first mounting plate is at least partially located in said inset and between said frame rail and said vertically extending support when said frame rail is connected to said vertically extending support.

9. The mounting configuration in accordance with claim 8, wherein said first interlocking element comprises a female interlocking element of said first mounting plate which accepts at least a portion of said vertically extending support therein.

10. The mounting configuration in accordance with claim 7, wherein said frame rail comprises a top flange and a spaced bottom flange at said rear side, said first mounting plate positioned between said top and bottom flanges of said frame rail.

11. The mounting configuration in accordance with claim 7, wherein said first mounting plate comprise a pair of side flanges which are located at a second side and a third side of said vertically extending support.

12. The mounting configuration in accordance with claim 9, further comprising a second mounting plate located at said first side of said vertically extending support, said second interlocking element comprising a male interlocking element associated with said second mounting plate.

13. The mounting configuration in accordance with claim 7, further comprising a first mounting plate connected to said frame rail and a second mounting plate connected to said vertically extending support, wherein said first and second interlocking elements are associated with said first and second mounting plates.

14. The mounting configuration in accordance with claim 1, wherein said first interlocking element comprises a female keyway and said second interlocking element comprises a second keyway, and further comprising a key engaging said first and second keyways.

15. The mounting configuration in accordance with claim 1, wherein said at least one fastener engages a rivet nut mounted to said vertically extending support.

16. The mounting configuration in accordance with claim 1, wherein said vertically extending support comprises a canopy post.

17. A mounting configuration for of a boat dock, comprising:
a boat dock having a deck;
a generally horizontally extending frame rail having a front side facing towards a side of said boat dock and an opposing rear side facing outwardly of said boat dock;
a vertically extending support located between a portion of said boat dock and said rear side of said frame rail, said vertically extending support extending generally perpendicular to said frame rail and vertically upwardly above said deck, said vertically extending support having a first side which faces said boat deck and an opposing second side which faces said rear side of said frame rail;
an interlocking element associated with said frame rail and said vertically extending support;
wherein a fastener opening extends through said frame rail from said front side to said rear side thereof, said wherein said interlocking element joins said frame rails and said vertically extending support when said frame rail is connected to said vertically extending support by at least one fastener which is located in said fastener opening.

18. The mounting configuration in accordance with claim 17, wherein said frame rail further comprises a rub rail mount which is configured to accept at least a portion of a rub rail and mount said rub rail so that at least a portion of said rub rail is located at said front side of said frame rail opposite said vertically extending support, and extends over said fastener opening.

19. The mounting configuration in accordance with claim 17, wherein said interlocking element comprises a male interlocking element associated with at least one of the frame rail and the vertically extending support and a female interlocking element associated with the other of the frame rail and the vertically extending support.

20. The mounting configuration in accordance with claim 17, wherein said interlocking element comprises a first female interlocking element associated with said frame rail, a second female interlocking element associated with said vertically extending support, and a key engaging said first and second interlocking elements.

\* \* \* \* \*